United States Patent [19]

Hansen

[11] Patent Number: 4,642,786

[45] Date of Patent: Feb. 10, 1987

[54] METHOD AND APPARATUS FOR POSITION AND ORIENTATION MEASUREMENT USING A MAGNETIC FIELD AND RETRANSMISSION

[75] Inventor: Per K. Hansen, Burlington, Vt.

[73] Assignee: Position Orientation Systems, Ltd., South Burlington, Vt.

[21] Appl. No.: 614,250

[22] Filed: May 25, 1984

[51] Int. Cl.⁴ .......................... G01B 7/14; G01S 5/14; G06F 15/32

[52] U.S. Cl. .................................... 364/559; 324/207; 324/208

[58] Field of Search ................. 364/559, 449; 324/207, 324/208, 247

[56] References Cited

U.S. PATENT DOCUMENTS

| | | | |
|---|---|---|---|
| 3,457,502 | 7/1969 | Cohn | 324/239 |
| 3,644,825 | 2/1972 | Davis, Jr. et al. | 340/568 |
| 3,781,664 | 12/1973 | Rorden | 324/247 |
| 3,866,229 | 2/1975 | Hammack | 364/451 |
| 3,868,565 | 2/1975 | Kuipers | 324/207 |
| 3,983,474 | 9/1976 | Kuipers | 324/207 |
| 3,988,734 | 10/1976 | Elwood | 364/449 |
| 4,281,321 | 7/1981 | Narlow et al. | 340/572 |
| 4,303,910 | 12/1981 | McCann | 340/572 |
| 4,314,251 | 1/1982 | Raab | 364/449 |
| 4,356,477 | 10/1982 | Vandebult | 340/572 |
| 4,359,733 | 11/1982 | O'Neill | 364/449 |
| 4,533,871 | 8/1985 | Boetzkes | 324/207 |
| 4,542,344 | 9/1985 | Darilek et al. | 324/326 |
| 4,560,930 | 12/1985 | Kouno | 324/247 |

*Primary Examiner*—Felix D. Gruber
*Assistant Examiner*—Danielle Laibowitz
*Attorney, Agent, or Firm*—Sherman and Shalloway

[57] ABSTRACT

Disclosed herein are method and apparatus for position and orientation measurement using a magnetic field and retransmission thereof. In a first embodiment, three coils are deployed as a three-axis antenna. A magnetic field is transmitted sequentially from the three coils each of which coil comprises the transmitter and receiver. Three passive resonant circuits are used as retransmitters and attached to an object the position and orientation of which are to be measured. The three coils, one from each of the retransmitters, are deployed as a three-axis antenna. In a second embodiment of the present invention, the three coils mentioned above with reference to the first embodiment are deployed merely as a three-axis receiver. As such, a separate coil is provided for the purpose of transmission. The three-axis retransmitter is attached to the object, the position and orientation of which are to be determined. In a third embodiment of the present invention, a transmitter coil is provided as well as a single resonant circuit retransmitter. In conjunction with these coils, nine coils are deployed as three-axis antennas which operate as receivers to receive the retransmissions from the retransmitter which is attached to the object and the thereby enable determination of the position and orientation of the object.

25 Claims, 10 Drawing Figures

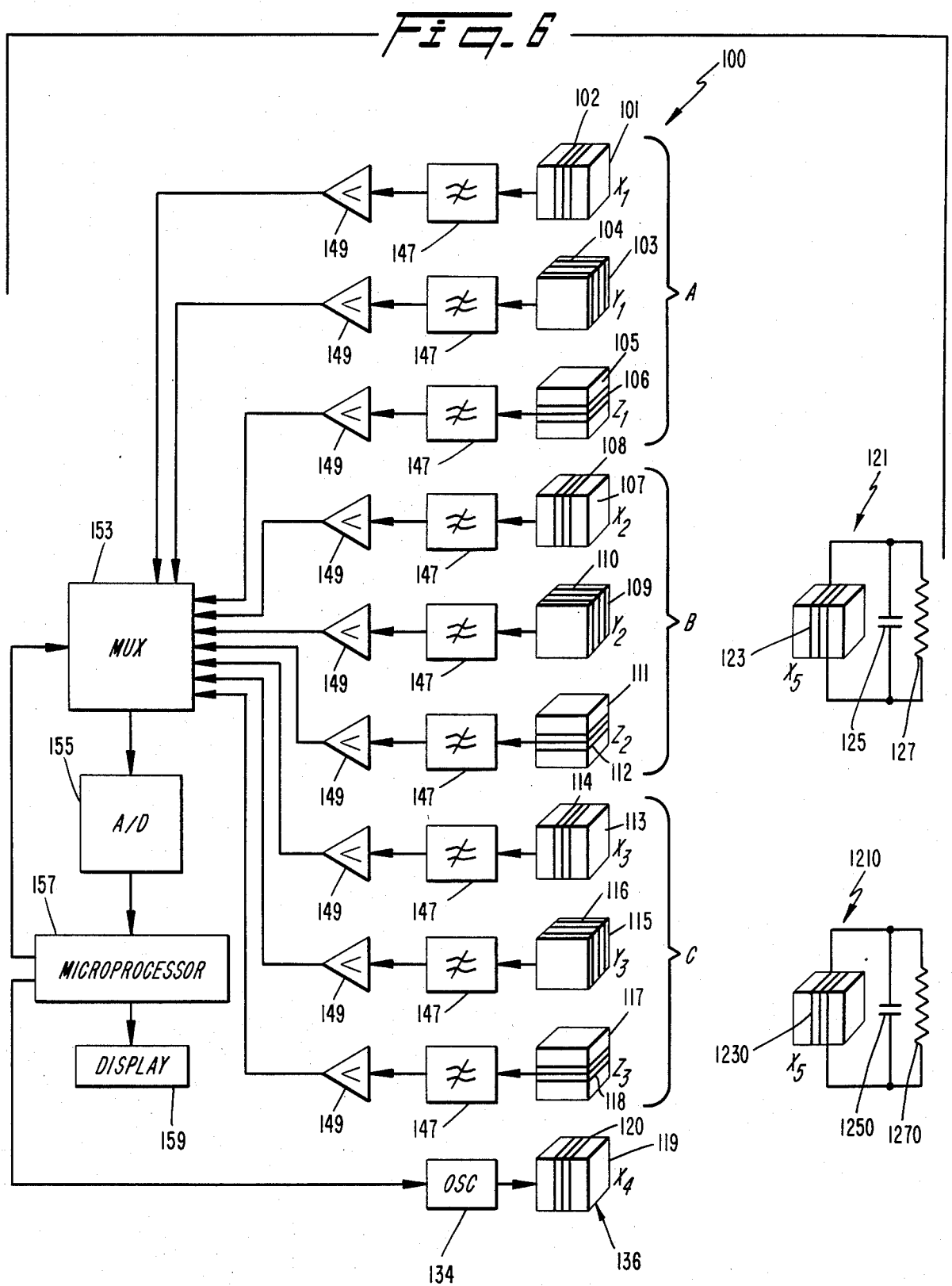

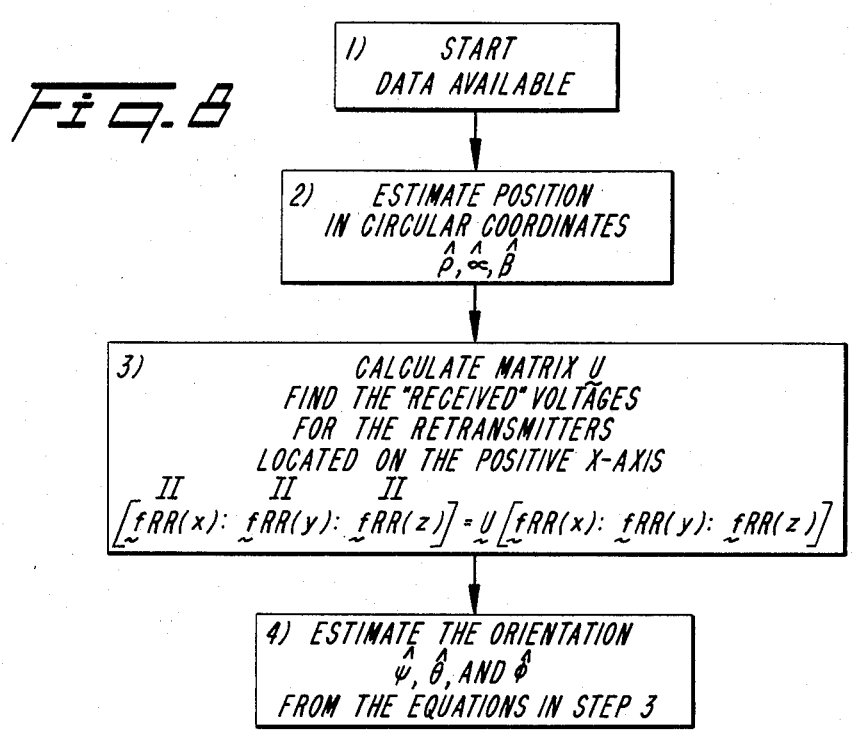
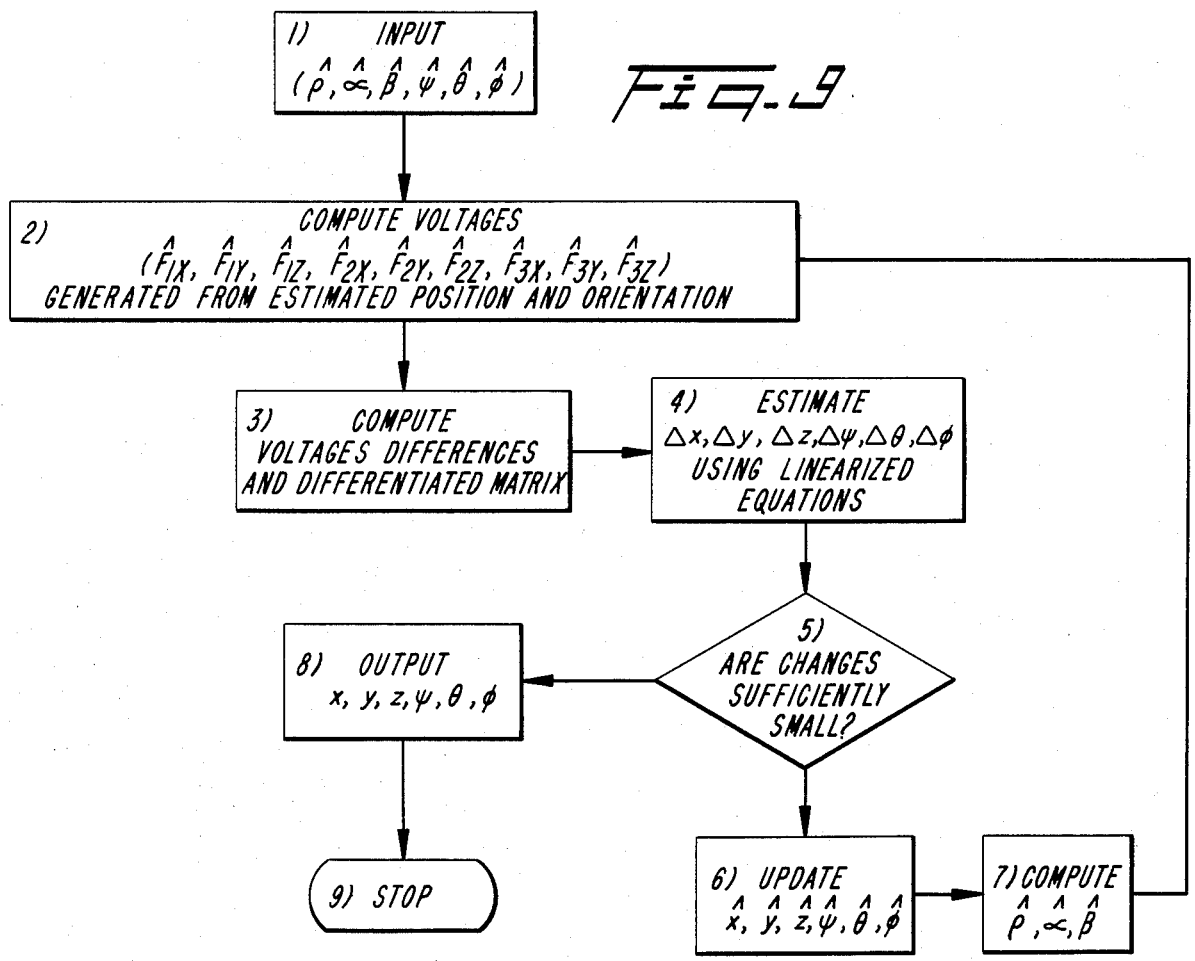

METHOD AND APPARATUS FOR POSITION AND ORIENTATION MEASUREMENT USING A MAGNETIC FIELD AND RETRANSMISSION

BACKGROUND OF THE INVENTION

This invention relates to a method and apparatus for position and orientation measurement using a magnetic field and retransmission. There has long been a need for a position and orientation measuring system including a passive sensor unconnected to the computing portion of the system, with the system being capable of tracking a plurality of objects and including great simplicity. In the prior art, this combination of features has been found to be lacking as should become clear from the detailed discussion of the prior art known to applicant, as follows:

U.S. Pat. No. 3,868,565 to Kuipers discloses a system which detects the position and orientation of an object in two dimensions (FIGS. 9-10) or three dimensions (FIG. 11). For example, (FIG. 11), the object has affixed thereto mutually orthogonal magnetic field sensing coils related to magnetic field generating coils. Signals are induced in the sensing coils dependent upon their position and orientation to thereby determine the object's position and orientation. This system is quite different from the systems disclosed herein in that there is no separation of the source coils and the sensor coils, information transformation between the source and the sensor is necessary, no retransmission of the magnetic field is contemplated, the sensor is not passive, the patented invention may only detect one object at a time and there is no means for compensation for non-orthogonality of coils or for metallic scatters.

U.S. Pat. No. 4,054,881 to Raab discloses three mutually-orthogonal radiating antennas each of which transmits electromagnetic radiation to three mutually orthogonal receiving antennas. The receiving antennas measure the radiated signals and produce nine parameters which enable calculations of the position and orientation of the receiving antennas with respect to the transmitting antennas. This patented invention is quite different from the inventions disclosed herein for many reasons including: there is no retransmission of the magnetic fields utilized therein, the transmitting and receiving antennas are integrally connected in the system and the sensor is not passive; further, there is no means for compensation for non-orthogonality of coils or for metallic scatters.

U.S. Pat. No. 4,119,908 to Cosman, et al., discloses a means for locating a pole box buried underground which includes the use of a passive marker including a circuit resonant at a particular frequency. A transmitter is utilized to generate the particular frequency of resonance of the passive marker to thereby enable detection thereof. There are several differences from this invention and the inventions disclosed herein including the fact that the transmitter is moved while the passive marker remains stationary just opposite to the structure and operation of the present invention, the passive marker's resonant circuit merely changes the magnetic pattern transmitted from the transmitter along the pipe and as such no real retransmission in the sense with which retransmission is contemplated in the present invention is used and, further, any measurements contemplated by the patented invention are only in two dimensions whereas with the present invention three-dimensional, as well as three additional degrees of freedom including pitch, roll, and yaw, are measured.

U.S. Pat. No. 4,281,321 to Narlow, et al., discloses a system which determines the presence of a surveillance tag attached to merchandise. The system includes a mat which forms a capacitive coupling with a pedestrian who steps thereon. If this pedestrian is carrying merchandise which includes a surveillance tag attached thereto indicative of the potential theft of the merchandise, the surveillance tag is sensed by the system. This invention is vastly different from the inventions disclosed herein since it merely detects the presence of a surveillance tag and not the precise position and orientation thereof. Further, there is no use in the patented invention of mutually orthogonal coils in either the transmitter or sensor and, further, the system operates with a very high frequency well above the low frequency magnetic near-field utilized by the present invention.

U.S. Pat. No. 4,303,910 to McCann discloses a system for monitoring the position of a retransmitter attached to a target within a work area. A transmitter or transmitters transmit a signal into the work area which is retransmitted back to a receiver. The receiver determines the position of the retransmitter by interpreting the received signal. This invention is different from the inventions disclosed herein basically because no position or orientation measurements are made and further for the reasons set forth with regard to the above-discussed U.S. Pat. No. 4,281,321.

U.S. Pat. No. 4,308,530 to Kip, et al., discloses a system which includes a wafer with a resonance circuit including a coil capacitor and diode. A transmitter transmits signals at two frequencies and a receiver receives signals retransmitted by the wafer to determine when the wafer is located in an unauthorized location while attached to an object being monitored thereby. This system is a theft-detection system similar in nature to the above-discussed U.S. Pat. No. 4,281,321 and 4,303,910. The system is only able to detect the presence of the receptor-reradiator in a surveillance area and does not detect the position or orientation thereof.

U.S. Pat. No. 4,356,477 to Vandebult discloses a resonant tag circuit responsive to at least one frequency of electromagnetic radiation. A transmitter transmits a signal at a frequency at which the circuits in the tag resonate, with the resonant signal being detected by a receiver for a variety of purposes. Again, this is a theft-detection system similar in nature to the above-discussed U.S. Pat. Nos. 4,281,321; 4,303,910 and 4,308,530 and is distinct from the teachings of the present invention for the same reasons as noted hereinabove.

The following prior art U.S. patents are also known to applicant and are believed to be of only general interest to the teachings of the present invention: Nos. 3,457,502; 3,644,825; 4,041,285; 4,160,204 and 4,314,251.

SUMMARY OF THE INVENTION

The present invention ovecomes the deficiencies and shortcomings of the prior art as espoused hereinabove by providing three exemplary embodiments.

In a first embodiment of the present invention, a system is provided which includes three coils deployed as a three-axis antenna and utilized for both transmitting and receiving of magnetic fields between approximately 10 and 100 kilohertz. A retransmitter is provided as attached to an object the position and orientation of which are to be determined. The transmitter consists of three passive resonant circuits whose coils are attached together as a three-axis antenna. In the operation of the system, a magnetic field is transmitted from the three transmitter/receiver coils sequentially using three different frequencies. These three frequencies correspond to the respective resonant frequencies of the three passive resonant circuits attached to the object. Each respective passive resonant circuit retransmits its respective magnetic field and, from these received sequential magnetic fields, the position and orientation of the object may be determined.

A second embodiment of the present invention is similar to the above-described first embodiment thereof. The main difference therebetween lies in the fact that the second embodiment uses a separate transmitter for the respective magnetic fields and the coils utilized in the first embodiment as transmitter/receivers, in this embodiment, merely comprise receivers. The transmitter sequentially transmits the three frequencies which are retransmitted by the retransmitters and received by the receiver coils. From the received magnetic fields, the position and orientation of the object may be determined.

In a third embodiment of the present invention, the system includes a transmitter coil, one retransmitter attached to the object the position and orientation of which are to be determined, and nine receiver coils which are deployed as three three-axis antennas. In the operation of this embodiment, the transmitter coil transmits a magnetic field at a predetermined frequency corresponding to the resonant frequency of the resonance circuit in the retransmitter. The magnetic field retransmitted by the retransmitter is received at the three three-axis antennas which convert the field as received thereby into voltages which may be utilized to calculate the position and orientation of the object to which the single retransmitter is attached.

Accordingly, it is a first object of the present invention to provide a system enabling position and orientation measurements using a magnetic field and the concept of retransmission.

It is a further object of the present invention to provide such a system wherein the sensing means attached to an object, the position and orientation which are to be measured, is passive and as such unconnected to the rest of the system.

It is a yet further object of the present invention to provide such a system which operates utilizing the concept of retransmission of a tuned circuit at the resonant frequency thereof.

It is a yet further object of the present invention to provide such a system wherein magnetic fields are transmitted from transmitting members, the magnetic fields cause the respective retransmitters to retransmit the magnetic fields, and receiving means is utilized to receive the retransmitted fields and therefrom calculate the precise position and orientation of the object to which the retransmitting means is attached.

It is a yet further object of the present invention to provide such a system wherein compensation is possible for the induced voltages over the receiver coils caused by the magnetic field generated by the transmitter alone.

It is a yet further object of the present invention to provide such a system wherein compensation is possible for possible nonorthogonality of transmission and/or receiver coils as well as for undesirable metallic scatters.

It is a yet further object of the present invention to provide such a system which may sequentially track a plurality of objects located within a predetermined space.

It is a yet further object of the present invention to provide methods of operation corresponding to the system and embodiments herein.

These and other objects, aspects and features of the present invention will be better understood from the following detailed description of the preferred embodiments when read in conjunction with the appended drawing figures.

BRIEF DESCRIPTION OF THE DRAWINGS

FIG. 5 shows a geometrical view of the three-axis retransmitter with respect to the three-axis transmitter/receiver of FIG. 3 or the three-axis receiver of FIG. 4.

FIG. 6 shows a schematic view of a third embodiment of the present invention.

FIG. 8 shows a flow chart for the non-linearized algorithm utilized in calculating the estimated position and orientation of an object.

SPECIFIC DESCRIPTION OF THE PREFERRED EMBODIMENT

Theory

Before discussing the exemplary preferred embodiments, it is believed instructive to discuss the theoretical aspects of the present invention.

Many different configurations are possible for the present invention with three basic configurations being described herein. All other configurations can be derived from these three basic configurations. Herein, the following symbols are defined as follows: (see FIG. 5 and FIG. 7)

$\rho$: distance from transmitter to retransmitter
$\alpha$: position azimuth angle
$\beta$: position elevation angle
$\psi$: orientation azimuth angle (yaw)
$\theta$: orientation elevation angle (pitch)
$\phi$: orientation roll angle (roll)
[notations used for ships, and aircraft movement]

A first system (FIG. 3) uses a retransmitter having three passive resonant circuits, with resonant frequencies $f_1$, $f_2$, and $f_3$. The resonant circuits are preferably attenuated 30–40 dB at the other resonant circuits' resonant frequencies and at $f_0$. The transmitter/receiver system is able to transmit and receive at the frequencies $f_0$, $f_1$, $f_2$, and $f_3$. The frequency $f_0$ is used to measure the scattering from metallic scatters in the environment. The system transmits from the x-coil at $f_0$ and $f_1$, the y-coil at $f_0$ and $f_2$, and the z-coil at $f_0$ and $f_3$ with pulsed sine waves one after the other. The system receives the retransmitted field at the three transmitter/receiver coils for each transmitted frequency. The system could, if desired, used only the x-coil as transmitter for the frequencies $f_0$, $f_1$, $f_2$, and $f_3$.

Figure 3:
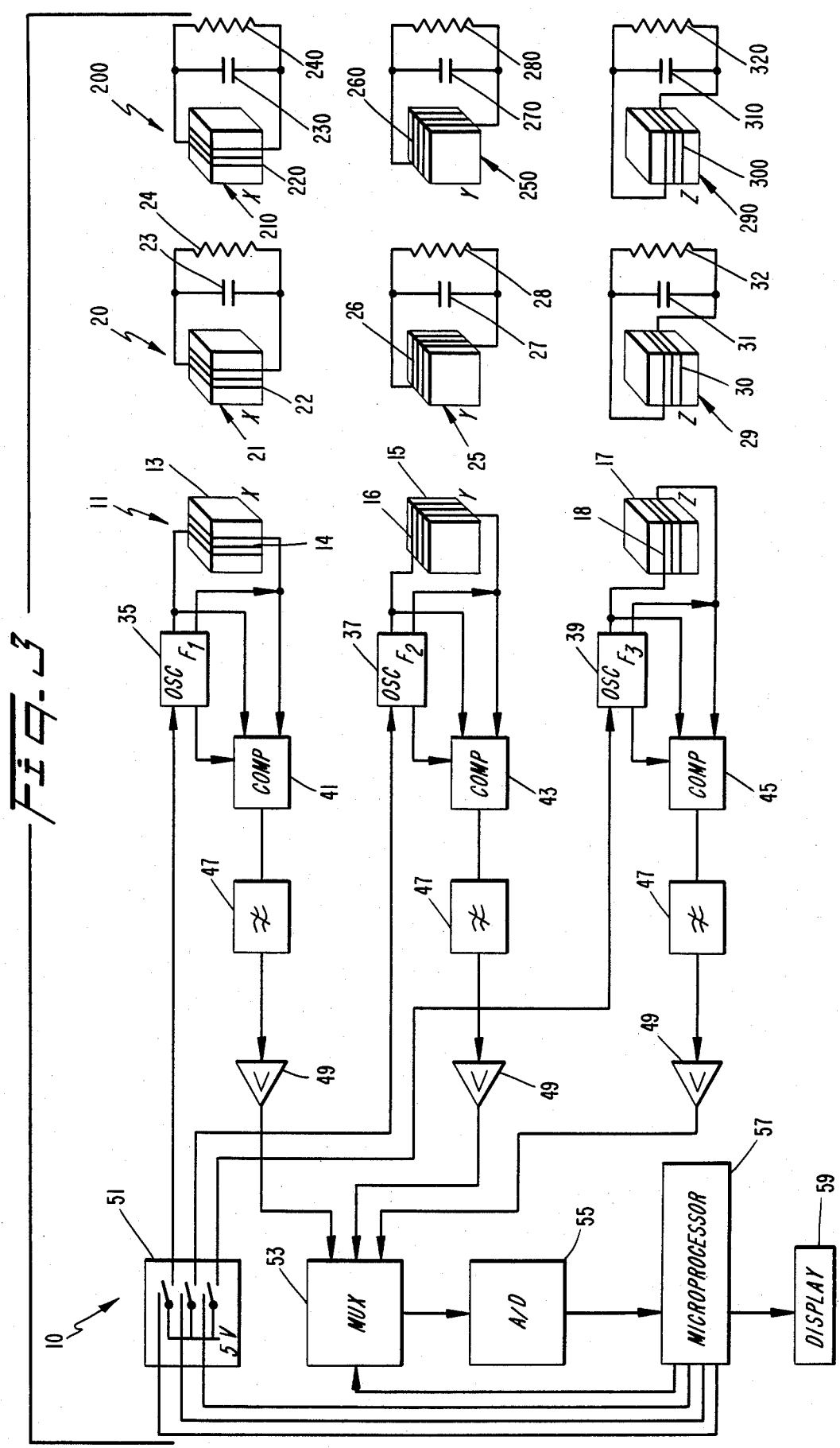
FIG. 3 shows a schematic view of a first embodiment of the present invention.

A second embodiment (FIG. 4) comprises a modification of the embodiment of FIG. 3. In this embodiment, a separate transmitter is provided and the transmitter/receivers of the FIG. 3 embodiment become merely receivers. The single transmitter transmits the three frequencies sequentially for sequential receipt at the three receivers.

A third embodiment (FIG. 6) uses a retransmitter, one passive resonant circuit, with resonant frequency $f_1$. The resonant circuit is attenuated 30–40 dB at $f_0$. The transmitter/receiver system is able to transmit and receive at frequencies $f_0$ and $f_1$. The frequency $f_0$ is used to measure the scattering from metallic scatters in the environment. The system transmits pulsed sine waves at frequency $f_1$ from one coil and receives the retransmitted field at all three three-axis receiver coils.

Only the calculations for the system using a three-axis transmitter/receiver and a three-axis retransmitter are made hereinafter. The calculations for other configurations may be derived in a similar way by those skilled in the art.

Magnetic Fields

The present invention assumes the use of source and sensor loops whose diameters are small in comparison to the distance separating them. They can therefore be regarded as point sources and point sensors. The excitation frequency is low enough that the field structure retains essentially free-space geometry throughout the region in which the sensor may be located.

The condition for quasi-static field (only the term varying as the inverse cube of distance is significant), $\rho << \lambda/\pi$ where $\lambda=$ the wavelength of the magnetic field, gives for the frequency 10 kHz, $\rho<<4.77 \cdot 10^3$ m and for the frequency 100 kHz, $\rho<<4.77 \cdot 10^2$ m. The frequency of the systems described herein should be between 10 kHz and 100 kHz for a 1 m motionbox.

Figure 1:
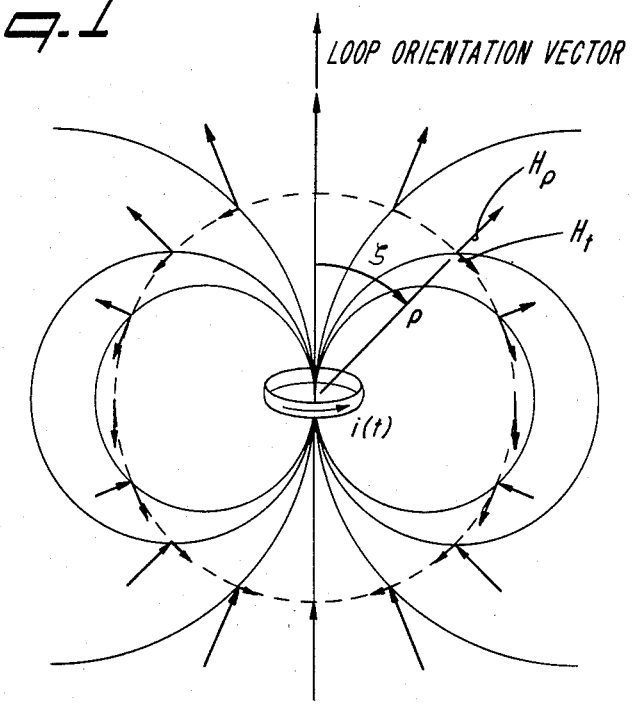
FIG. 1 shows a schematic view of a loop excited with a current to produce a magnetic field including identification of various aspects of the magnetic field for the purpose of the theoretical discussion herein.

Suppose now that the loop shown in FIG. 1 is excited with a current $i(t)=I \cos \omega t$. The magnetic field produced at a point of distance $\rho$ and off-axis angle $\zeta$ is described completely by the radial and the tangential components as follows:

$$H_\rho = \mu_T(M/2\pi\rho^3) \cos \zeta \qquad (1)$$

$$H_t = \mu_T(M/4\pi\rho^{33}) \sin \zeta, \qquad (2)$$

where $M=NIA$ is the magnetic moment of the loop and A and N represent the area and number of turns of the loop and $\mu T$ is the relative permeability of the ferrite inside the coil. A temporal variation of $\exp(J\omega t)$ is implied, the spatial phase variation of $\exp(j\rho\lambda)$ can be neglected in this application. This characterization is valid for a loop of any shape as long as the distance is more than about four times the radius of the loop. Note that the amplitude of the fields is independent of the frequency.

System with a Three-Axis Source and a Three-Axis Sensor

Figure 2:
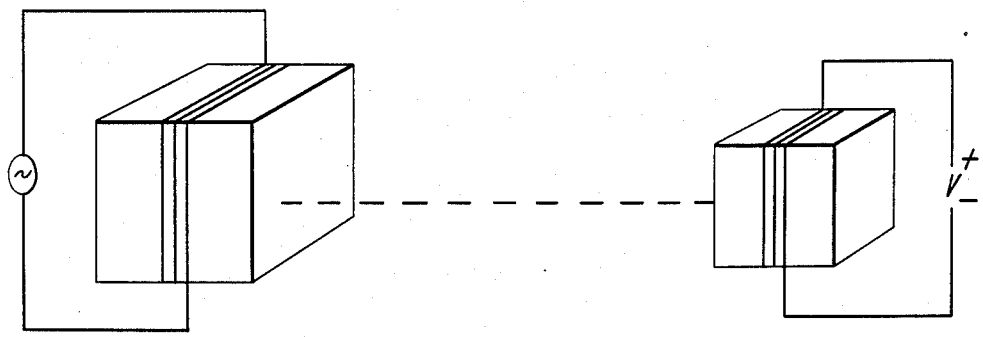
FIG. 2 shows the orientation of a transmitter/receiver coil and a retransmitter coil when aligned for maximum received signal.

The received voltage of the sensor generated from the magnetic field of the source coil, when aligned for maximum received signal as shown in FIG. 2 is:

$$V = 2 \pi f \mu_R \mu_o A_R N_R H_\rho \qquad (3)$$

where
 f = frequency of magnetic field
 $\mu_R$ = the relative permeability of the ferrite inside the receiver coil
 $\mu_o = 4\pi 10^{-7}$ is a free space constant
 $A_R$ = Area of the receiver loop
 $N_R$ = Number of turns of the receiver loop The coils are arranged in two three-axis antennas; the source and the sensor (See FIG. 5). This means that the first coil (the x-coil) is placed for maximum signal in the x-axis direction the second coil (the y-coil) is placed for maximum signal in the y-axis direction and the third coil (the z-coil) is placed for maximum signal in the z-axis direction.

The excitation of a three-axis magnetic dipole source and the resultant fields at a particular location are most conveniently described in vector notation. The excitation of the source is therefore represented by $$\underline{f}_T = \begin{bmatrix} f_x \\ f_y \\ f_z \end{bmatrix}. \qquad (4)$$

The number of turns and area of the three source loops are assumed to be identical, so $f_x=1$ for excitation of the x-coil, $f_y=1$ for excitation of the y-coil, and $f_z=1$ for excitation of the z-coil.

Consider the output of a multi-axis sensor of zero orientation ($\psi=\theta=\phi=0$) represented by $f_o=[f_{ox}, f_{oy}, f_{oz}]^T$. If the zero-orientation sensor is located on the x-axis, each loop in the source is coupled only to the identically aligned sensor axis. Since the $Y_1-Y_o$ and $Z_1-Z_o$ couplings are produced by tangential field components (2), their amplitudes are reduced by a factor of $-\frac{1}{2}$ from the amplitude of the $X_1-X_o$ coupling, which results from a radial field component (1). The coupling can be described completely in vector-matrix form by $$\underline{f}_o = \frac{C_T}{\rho^3} \underline{S} \ \underline{f}_T = \frac{C_T}{\rho^3} \begin{bmatrix} 1 & 0 & 0 \\ 0 & -\frac{1}{2} & 0 \\ 0 & 0 & -\frac{1}{2} \end{bmatrix} \underline{f}_T, \qquad (5)$$

where $C_T = \dfrac{N_T A_T I_T}{2\pi} 2\pi f \mu_R A_R N_R$ and $\underline{f}_o = [V_1, V_2, V_3]^T$ are the voltages measured in the three receiver coils.

The coupling between a source and sensor of arbitrary position and orientation can be determined by inserting orthogonal rotation matrices into (5). The geometry for two embodiments of systems in accordance with the present invention is shown in FIG. 5. These matrices are based upon position azimuth ($\alpha$), position elevation ($\beta$), orientation azimuth ($\psi$), orientation elevation ($\theta$), and orientation roll ($\phi$), as shown in Table 1.

TABLE I
ORTHOGONAL ROTATION MATRICES

| | Position | Orientation |
|---|---|---|
| Azimuth Rotates x into y | $\underline{T}_\alpha = \begin{bmatrix} \cos\alpha & \sin\alpha & 0 \\ -\sin\alpha & \cos\alpha & 0 \\ 0 & 0 & 1 \end{bmatrix}$ | $\underline{T}_\psi = \begin{bmatrix} \cos\psi & \sin\psi & 0 \\ -\sin\psi & \cos\psi & 0 \\ 0 & 0 & 1 \end{bmatrix}$ |
| Elevation Rotates x into z | $\underline{T}_\beta = \begin{bmatrix} \cos\beta & 0 & -\sin\beta \\ 0 & 1 & 0 \\ \sin\beta & 0 & \cos\beta \end{bmatrix}$ | $\underline{T}_\theta = \begin{bmatrix} \cos\theta & 0 & -\sin\theta \\ 0 & 1 & 0 \\ \sin\theta & 0 & \cos\theta \end{bmatrix}$ |
| Roll Rotates y into z | not applicable | $\underline{T}_\phi = \begin{bmatrix} 1 & 0 & 0 \\ 0 & \cos\phi & \sin\phi \\ 0 & -\sin\phi & \cos\phi \end{bmatrix}$ |

Note that the subscript defines both the type of transformation and its independent variable Consider first the coupling between the source and a zero orientation sensor located at $(\alpha, \beta, \rho)$. The excitation $\underline{f}_T'$ of an equivalent source whose x axis is aligned with a line connecting the source and the sensor can be determined by rotating the excitation vector of the real source by position azimuth and elevation, thus $$\underline{f}_T' = \underline{T}_\beta \underline{T}_\alpha \underline{f}_T. \qquad (6)$$

The output $\underline{f}_0$ from a similarly aligned equivalent sensor then has the same form as (5), i.e., $$\underline{f}_0' = (C_T/\rho^3)\underline{S}\underline{f}_T' \qquad (7)$$

The output of the zero-orientation sensor is then found by applying inverse position and orientation rotations, thus $$\underline{f}_0 = (C_T/\rho^3)\underline{T}_{-\alpha}\underline{T}_{-\beta}\underline{S}\underline{T}_\beta\underline{T}_\alpha\underline{f}_T = (C/\rho^3)\underline{Q}^{-1}\underline{S}\underline{Q}\underline{f}_T \qquad (8)$$

The output of the multi-axis sensor of arbitrary orientation $(\psi, \theta, \phi)$ is determined by applying orientation azimuth, elevation and roll rotations to the output of the zero-orientation sensor, thus $$\underline{f}_R = \underline{T}_\phi \underline{T}_\theta \underline{T}_\psi \underline{f}_0 = \underline{T}_A \underline{f}_0. \qquad (9)$$

The above can be combined with (8) to show the coupling between a given source and a multi-axis sensor of arbitrary orientation; e.g., $$\underline{f}_R = (C_T/\rho^3)\underline{T}_A \underline{Q}^{-1}\underline{S}\underline{Q}\underline{f}_T \qquad (10)$$

The mathematical manipulations of equations 1-10 were made in order to solve the simple case of a three-axis source and a three-axis sensor.

System with Retransmitters

The situation now consists of a three-axis source which transmits the magnetic field and a retransmitter which receives the magnetic field. The retransmitter consists of three passive resonance circuits, so that when the magnetic field is received, the circuit will be in resonance and the magnetic field will be retransmitted toward the transmitter which also works as a receiver. This means the transmitter/receiver transmits a magnetic field, the retransmitter receives and retransmits the magnetic field and the transmitter/receiver receives the retransmitted magnetic field. In order to find the voltages received at the source (the transmitter/receiver) the same method as described above is used where the retransmitter is considered as the source and the transmitter/receiver is considered as the sensor.

The transmitter coil produces the magnetic field (the ideal dipole field and free-space equations are used)

$$H_\rho = \frac{N_T I_T A_T}{4\pi\rho^3} \mu_T, \text{ where} \qquad (11)$$

$N_T$ = number of turns of transmitter coil
$I_T$ = current in transmitter coil
$A_T$ = receive area of transmitter coil
$\mu_T$ = relative permeability of transmitter coil The voltage induced in the retransmitter is, when the two coils are aligned for maximum received signal:

$$V_{RT} = 2\pi f \mu_{RT} \mu_0 \frac{N_T I_T A_T}{4\pi\rho^3} \mu_T A_{RT} N_{RT}, \text{ where} \qquad (12)$$

$V_{RT}$ = voltage induced in the retransmitter
f = frequency of the magnetic field
$M_{RT}$ = relative permeability of retransmitter coil
$\mu_0$ = free space permeability
$A_{RT}$ = receive area of retransmitter coil
$N_{RT}$ = number of turns in retransmitter coil The induced current in the retransmitter is $$I_{RT} = \frac{V_{RT} Q_{RT}}{\omega L_{RT}}, \text{ where} \qquad (13)$$

$I_{RT}$ = current in retransmitter
$Q_{RT}$ = quality factor of retransmitter coil
$\omega$ = radiant frequency (= $2\pi f$).
$L_{RT}$ = inductance of retransmitter circuit The retransmitter transmits the field $$H_{\rho RT} = \frac{N_{RT} I_{RT} A_{RT} \mu_{RT}}{4\pi\rho^3} \qquad (14)$$

The induced voltage in the receiver is $$V_{RR} = (2\pi f)^2 \mu_0^2 \mu_T N_T I_T A_T \frac{N_{RT} \mu_{RT}^2 Q_{RT} A_{RT}}{\omega L_{RT} (4\pi\rho^3)^2} \mu_R N_R A_R, \text{ where} \qquad (15)$$

$\mu_R$ = relative permeability of receiver coil
$N_R$ = number of turns in receiver coil
$A_R$ = receive area of receiver coil The following amplitude measurement derivations are of special interest:

$$V_{RR} = 2\pi f 10^{-14} \frac{1}{\rho^6} \mu_T N_T I_T A_T \frac{N_{RT} \mu_{RT}^2 A_{RT} Q_{RT}}{L_{RT}} A_R N_R \mu_R, \qquad (16)$$

$$V_{RT} = f \mu_{RT} \mu_0 \frac{N_T I_T A_T \mu_T}{2\rho^3}, \qquad (17)$$

$$I_{RT} = \mu_{RT} \mu_0 \frac{N_T I_T A_T}{4\pi\rho^3} \mu_T \frac{Q_{RT}}{L_{RT}} \qquad (18)$$

$$H_\rho = \frac{N_T I_T A_T}{4\pi\rho^3} \mu_T, \qquad (19)$$

$$H_{\rho RT} = 10^{-7} \frac{1}{4\pi\rho^6} \frac{N_{RT} Q_{RT} A_{RT} \mu_{RT}^2}{L_{RT}} N_T I_T A_T \qquad (20)$$

The magnetic noise field H (noise) $\leq -80$ dB at 10–100 kHz in a 1 Hz bandwidth. Both $H_\rho$ and $H_{\rho RT}$ must have a higher value than H(noise). The following must also be satisfied: $V_{RT} > V_{RT}$(noise), $V_{RR} > V_R$(noise), and $V_T > V_T$(noise).

There are two special cases:

1. Transmitter and receiver coils are the same:

When the same coil transmits and receives, the voltage placed over the coil in order for it to transmit a magnetic field must be subtracted from the sensed voltage over the coil in order to get the received signal.

When the transmission is made with the x-axis coil, no voltage will be induced over the y-axis and the z-axis coils since they are perpendicular to the x-axis coil. It is then easy to see what happens for transmission with the y-axis or the z-axis coil.

2. Transmitter and receiver coil are separated:

When the transmitter coil generates a magnetic field, voltages are induced over the receiver coils unless the receiver coils and the transmitter coil are perpendicular to each other. The induced voltages are measured initially for all operating frequencies with no retransmitters present. A compensation can then be made using comparators or by preprogramming the microcomputer.

The final designs of the systems disclosed herein must take into account the following stability considerations: (1) temperature stability, (2) double induced voltage, (3) retransmitter influence on the frequency of the transmitter, (4) retransmitter influence on transmitter amplitude, (5) frequency stability of the retransmitter, (6) the errors caused by circular or square loops.

Equations

It is now possible to set up nine equations with six unknowns, the position (x,y,z) and the orientation ($\Psi,\theta,\Phi$) of the retransmitter relative to the transmitter/receiver.

Step 1. The transmitter/receiver, transmits a magnetic field at the frequency $f_1$ from the x-coil placed for maximum signal in the x-axis direction. This magnetic field will be received at the x-axis coil in the retransmitter, placed for maximum received signal in the x-axis direction ($f_1$ is the resonance frequency for this resonant circuit; but it is not the resonance frequency for the circuitry which includes the y-axis coil or the z-axis coil). (See equations (79-84). Since the retransmitter is in resonance, a magnetic field will be retransmitted toward the transmitter/receiver. This magnetic field will be received at the three transmitter/receiver coils generating a voltage over each of the coils. This gives the vector equation (20) which contains three equations;

$$f_{RR}(x) = [V_1, V_2, V_3]^T \qquad (20)$$

Step 2. The transmitter/receiver transmits a magnetic field at the frequency $f_2$ from the y-coil placed for maximum signal in the y-axis direction. This magnetic field will be received at the y-coil in the retransmitter, placed for maximum received signals in the y-axis direction. ($f_2$ is the resonance frequency for this resonant circuit; but is not the resonance frequency for the circuits which include x-axis coil or z-axis coil). Since the retransmitter is in resonance, a magnetic field will be retransmitted toward the transmitter/receiver. This magnetic field will be received at the three transmitter/receiver coils generating a voltage over each of the coils. This gives the vector equation (21) which contains three equations:

$$f_{RR}(y) = [V_4, V_5, V_6]^T \qquad (21)$$

Step 3. The transmitter/receiver transmits a magnetic field at the frequency $f_3$ from the coil placed for maximum signal in the z-axis direction. This magnetic field will be received at the z-axis coil in the retransmitter, placed for maximum received signal in the z-axis direction ($f_3$ is the resonance frequency for this resonant circuit; but is not the resonance frequency for the circuits which include x-axis coil or y-axis coil). Since the retransmitter is in resonance, a magnetic field will be retransmitted toward the transmitter/receiver. This magnetic field will be received at the three transmitter/receiver coils generating a voltage over each of the coils. This gives the vector equation (22) which contains three equations:

$$f_{RR}(z) = [V_7, V_8, V_9]^T \qquad (22)$$

The received field at the retransmitter is:

$$f_{RT} = \frac{C_T}{\rho^3} T_\phi T_\theta T_\psi T_{-\alpha} T_{-\beta} S T_\beta T_\alpha f_T \qquad (23)$$

$$= \frac{C_T}{\rho^3} T_A Q^{-1} S Q f_T, \text{ where:}$$

where $$f_{RT} = \begin{bmatrix} V_{RT}(x) \\ V_{RT}(y) \\ V_{RT}(z) \end{bmatrix} \quad \text{the voltages over the retransmitter coils generated by the magnetic field from the transmitter.}$$

$$C_T = N_T A_T G_T / 2\pi$$

$$S = \begin{bmatrix} 1 & 0 & 0 \\ 0 & -\frac{1}{2} & 0 \\ 0 & 0 & -\frac{1}{2} \end{bmatrix}$$

$$T_A = T_\phi T_\theta T_\psi$$

$$Q = T_\beta T_\alpha$$

$$Q^{-1} = T_{-\alpha} T_{-\beta}$$

Where the transmitter excitations are $$f_T(x) = \begin{bmatrix} 1 \\ 0 \\ 0 \end{bmatrix}$$

(transmitter's x-axis coil activated)

$$f_T(y) = \begin{bmatrix} 0 \\ 1 \\ 0 \end{bmatrix}$$

(transmitter's y-axis coil activated)

-continued $$f_T(z) = \begin{bmatrix} 0 \\ 0 \\ 1 \end{bmatrix}$$

(transmitter's x-axis coil activated)

The received field at the receiver, generated from the retransmitter, is $$f_{RR}^{(i)} = \frac{C_{RT}}{\rho^3} \underline{T}_\phi \underline{T}_\theta \underline{T}_\psi \underline{T}_{-\alpha} \underline{T}_{-\beta} \underline{S} \underline{T}_\beta \underline{T}_\alpha f_{RT}^{1(i)}, \text{ where} \quad (24)$$

$$f_{RR} = \begin{bmatrix} V_{RR}(x) \\ V_{RR}(y) \\ V_{RR}(z) \end{bmatrix} \quad \begin{array}{l}\text{The voltages over the receiver}\\ \text{coils generated by the magnetic}\\ \text{field from the retransmitters.}\end{array}$$

Where the theorem of reciprocity is used, and the retransmitter "excitations" are $$f_{RT}^1(x) = \begin{bmatrix} f_{RTx} \\ 0 \\ 0 \end{bmatrix}, \quad f_{RT}^1(y) \begin{bmatrix} 0 \\ f_{RTy} \\ 0 \end{bmatrix}, \text{ and } f_{RT}^1(z) = \begin{bmatrix} 0 \\ 0 \\ f_{RTz} \end{bmatrix}, \quad (25)$$

and $C_{RT} = N_{RT} A_{RT} G_{RT}/2\pi$.

Non-Linearized Algorithm

With regard to the nonlinearized algorithm, the received fields at the receiver are:
for x-axis excitation:

$$f_{RR}(x) = \frac{C_T C_{RT}}{\rho^6} \underline{T}_A \underline{Q}^{-1} \underline{SQ} \begin{bmatrix} 1 & 0 & 0 \\ 0 & 0 & 0 \\ 0 & 0 & 0 \end{bmatrix} \underline{T}_A \underline{Q}^{-1} \underline{SQ} \begin{bmatrix} 1 \\ 0 \\ 0 \end{bmatrix}, \quad (26)$$

for y-axis excitation:

$$f_{RR}(y) = \frac{C_T C_{RT}}{\rho^6} \underline{T}_A \underline{Q}^{-1} \underline{SQ} \begin{bmatrix} 0 & 0 & 0 \\ 0 & 1 & 0 \\ 0 & 0 & 0 \end{bmatrix} \underline{T}_A \underline{Q}^{-1} \underline{SQ} \begin{bmatrix} 0 \\ 1 \\ 0 \end{bmatrix}, \quad (27)$$

for z-axis excitation:

$$f_{RR}(z) = \frac{C_T C_{RT}}{\rho^6} \underline{T}_A \underline{Q}^{-1} \underline{SQ} \begin{bmatrix} 0 & 0 & 0 \\ 0 & 0 & 0 \\ 0 & 0 & 1 \end{bmatrix} \underline{T}_A \underline{Q}^{-1} \underline{SQ} \begin{bmatrix} 0 \\ 0 \\ 1 \end{bmatrix}, \quad (28)$$

Equations 26, 27 and 28 are equations 24 and 25 written out fully.

Position Determination

The fields received at the receiver with a position-frame retransmitter in the transmitter/receiver coordinate system are then for x-axis excitation $$f_{RR}^I(x) = \frac{C_T C_{RT}}{\rho^6} \underline{SQ} \begin{bmatrix} 1 & 0 & 0 \\ 0 & 0 & 0 \\ 0 & 0 & 0 \end{bmatrix} \underline{SQ} \begin{bmatrix} 1 \\ 0 \\ 0 \end{bmatrix}, \quad (29)$$

The more specific received fields for the different excitations are then $$f_{RR}^I(x) = \frac{C_T C_{RT}}{\rho^6} \cos\alpha \cos\beta \begin{bmatrix} \cos\alpha \cos\beta \\ \tfrac{1}{2} \sin\alpha \\ -\tfrac{1}{2} \cos\alpha \sin\beta \end{bmatrix}, \quad (30)$$

$$f_{RR}^I(y) = \frac{C_T C_{RT}}{\rho^6} (-\tfrac{1}{2} \cos\alpha) \begin{bmatrix} \sin\alpha \cos\beta \\ -\tfrac{1}{2} \cos\alpha \\ -\tfrac{1}{2} \sin\alpha \sin\beta \end{bmatrix},$$

and $$f_{RR}^I(z) = \frac{C_T C_{RT}}{\rho^6} (-\tfrac{1}{2} \cos\beta) \begin{bmatrix} -\sin\beta \\ 0 \\ -\tfrac{1}{2} \sin\beta \end{bmatrix}$$

These excitations are, unfortunately, not directly observable. Equations 29 and 30 reflect the case wherein the transmitter, receiver and retransmitter coordinate systems are aligned.

Since the orthogonal rotations used to find the true received fields do not change the vector length and relative angle, it is apparent that $|f_{RR}| = |f^I_{RR}|$. The more tractable squared magnitudes or dot-products are similarly equal.

$$P(i) = f(i)_{RR}^T \cdot f(i)_{RR} = f(i)_{RR}^{I\,T} \cdot f(i)_{RR}^I, \text{ where } f(i)_{RR} = \begin{bmatrix} f(i)_x \\ f(i)_y \\ f(i)_z \end{bmatrix}; \quad (31)$$

$$f_{RR}^{(i)\,T} = (f(i)_x, f(i)_y, f(i)_z).$$

The self-dot products or sensed "power" are then $$P(x) = (C_T^2 C_{RT}^2/\rho^{12}) \cos^2 \alpha \cos^2 \beta \,(\cos^2 \alpha \cos^2 \beta + \tfrac{1}{4} \sin^2 \alpha + \tfrac{1}{4} \cos^2 \alpha \sin^2 \beta), \quad (32)$$

$$P(y) = (C_T^2 C_{RT}^2/\rho^{12})\tfrac{1}{4} \cos^2 \alpha \,(\sin^2 \alpha \cos^2 \beta + \tfrac{1}{4} \cos^2 \alpha + \tfrac{1}{4} \sin^2 \alpha \sin^2 \beta), \quad (33)$$

$$P(z) = (C_T^2 C_{RT}^2/\rho^{12})\tfrac{1}{4} \cos^2 \beta (\sin^2 \beta + \tfrac{1}{4} \cos^2 \beta). \quad (34)$$

DETERMINING POSITION IN CIRCULAR COORDINATES

The first step in determining position in circular coordinates is to sum the three measurable quantities $$P(T) = P(x) + P(y) + P(z) = \frac{9}{8} \frac{C_T^2 C_{RT}^2}{\rho^{12}} \quad (35)$$

where $S^4 = \begin{bmatrix} 1 & 0 & 0 \\ 0 & \tfrac{1}{16} & 0 \\ 0 & 0 & \tfrac{1}{16} \end{bmatrix}$ is used.

All dependence upon $\alpha$ and $\beta$ disappears and rearrangement yields $$\rho = \left[ \frac{9}{8} \frac{C_{RT} C_T}{P(T)} \right]^{\frac{1}{12}} \quad (36)$$

Once $\rho$ has been determined, then equation (34) is used to find $|\beta|$ $$\beta_A = |\beta| = \text{arc cos}\left(\frac{\frac{1}{4} \pm \left(\frac{1}{16} - \frac{12}{16} P(z) \frac{\rho^{12}}{C_T^2 C_{RT}^2}\right)^{-\frac{1}{2}}}{\frac{6}{16}}\right)^{-\frac{1}{2}} \quad (37)$$

Then $\alpha_A$ is found from the sum of equation (32) and 4 $\cos^2 \beta$·(equation 33)

$$\alpha_A = \left(\frac{2}{3} \frac{\rho^{12}}{C_{RT}^2 C_T^2} \frac{P(x) + 4 \cos^2 \beta P(y)}{\cos^2 \beta} + 1\right)^{-\frac{1}{2}} \quad (38)$$

Note that $\alpha$ contains a four-quadrant ambiguity, i.e., $\alpha = \alpha_A$, $\alpha = \pi - \alpha_A$, $\alpha = \pi + \alpha_A$ or $\alpha = 2\pi - \alpha_A$. The elevation angle $\beta$ contains a two-quadrant ambiguity, i.e., $\beta = \beta_A$ or $\beta = -\beta_A$. The preliminary determination of position quadrant can be done in a manner known to those skilled in the art.

ORIENTATION DETERMINATION

It is useful to begin the explanation of orientation determination by developing an algorithm that determines orientation in the special case of the retransmitter located on the positive x-axis in the transmitter/receiver coordinate-system.

In this situation $\alpha = 0$ and $\beta = 0$, hence $\underline{T}\beta = \underline{T}\alpha = \underline{I}$, which gives the x-axis excitation $$\underline{f}_{RR}^{II} = \frac{C_T C_{RT}}{\rho^6} \underline{T}_A \underline{S} \begin{bmatrix} 1 & 0 & 0 \\ 0 & 0 & 0 \\ 0 & 0 & 0 \end{bmatrix} \underline{T}_A \underline{S} \begin{bmatrix} 1 \\ 0 \\ 0 \end{bmatrix} \text{ where} \quad (39)$$

$$\underline{I} = \begin{bmatrix} 1 & 0 & 0 \\ 0 & 1 & 0 \\ 0 & 0 & 1 \end{bmatrix}$$

and $\underline{f}_{RR}^{II}(x), \underline{f}_{RR}^{II}(y), \underline{f}_{RR}^{II}(z)$ are the voltages over the receiver coils for a special transmitter/receiver-retransmitter positioning.

The following measurements are accordingly made:

$$\underline{f}_{RR}^{II}(x) = \frac{C_T C_{RT}}{\rho^6} \cos\theta\cos\psi \begin{bmatrix} \cos\theta \cos\psi \\ -\sin\psi \cos\phi + \sin\phi \sin\theta \cos\psi \\ \sin\phi \sin\psi - \cos\phi \sin\theta \cos\psi \end{bmatrix} \quad (40)$$

$$\underline{f}_{RR}^{II}(y) = \frac{C_T C_{RT}}{\rho^6} \cos\theta\sin\psi(\tfrac{1}{4}) \begin{bmatrix} \cos\theta \sin\psi \\ \cos\phi \cos\psi + \sin\phi \sin\theta \sin\psi \\ -\sin\phi \cos\psi + \cos\phi \sin\theta \sin\psi \end{bmatrix} \quad (41)$$

$$\underline{f}_{RR}^{II}(z) = \frac{C_T C_{RT}}{\rho^6} \cdot (-\tfrac{1}{4} \sin\theta) \begin{bmatrix} -\sin\theta \\ \sin\phi \cos\theta \\ \cos\phi \cos\theta \end{bmatrix} \quad (42)$$

The x-element of equation (42) can be solved for $$\theta = \arcsin\left(\frac{4\rho^6}{C_T C_{RT}} f_{RR}^{II}(z)_x\right). \quad (43)$$

Note that since $-90° \leq \theta < +90°$, $\theta$ is placed in the proper quadrant. Once $\theta$ is determined, the value of $\phi$ is found by dividing the y-element with the z-element of equation (42):

$$\phi = \arctan \frac{f_{RR}^{II}(z)_y}{f_{RR}^{II}(z)_z} \quad (44)$$

Since $-180° \leq \phi \leq 180°$, the value of $\phi$ can be placed in the proper quadrant by using a four-quadrant inverse tangent. The value of $\psi$ is found by dividing the x-element of equation (40)

$$\psi = \arctan\left(\frac{4 \cdot f_{RR}^{II}(y)_x}{f_{RR}^{II}(x)_x}\right)^{-\frac{1}{2}} \quad (45)$$

The use of a four-quadrant inverse tangent places $\psi$ in the proper quadrant.

Retransmitter of arbitrary location

The outputs of the receiver for a retransmitter located at the positive x-axis in the transmitter/receiver coordinate-system are represented by $$\underline{f}_{RR}^{II}(x) = \frac{C_T C_{RT}}{\rho^6} \underline{T}_A \underline{S} \begin{bmatrix} 1 & 0 & 0 \\ 0 & 0 & 0 \\ 0 & 0 & 0 \end{bmatrix} \underline{T}_A \underline{S} \begin{bmatrix} 1 \\ 0 \\ 0 \end{bmatrix} = \quad (46)$$

$$\frac{C_T C_{RT}}{\rho^6} \underline{T}_A \begin{bmatrix} 1 & 0 & 0 \\ 0 & 0 & 0 \\ 0 & 0 & 0 \end{bmatrix} \underline{T}_A \begin{bmatrix} 1 \\ 0 \\ 0 \end{bmatrix}$$

$$\underline{f}_{RR}^{II}(y) = \frac{C_T C_{RT}}{\rho^6} \underline{T}_A \begin{bmatrix} 0 & 0 & 0 \\ 0 & -\tfrac{1}{2} & 0 \\ 0 & 0 & 0 \end{bmatrix} \underline{T}_A \begin{bmatrix} 0 \\ -\tfrac{1}{2} \\ 0 \end{bmatrix}, \quad (47)$$

$$\underline{f}_{RR}^{II}(z) = \frac{C_T C_{RT}}{\rho^6} \underline{T}_A \begin{bmatrix} 0 & 0 & 0 \\ 0 & 0 & 0 \\ 0 & 0 & -\tfrac{1}{2} \end{bmatrix} \underline{T}_A \begin{bmatrix} 0 \\ 0 \\ \tfrac{1}{2} \end{bmatrix} \quad (48)$$

The x-axis responses are to be synthesized as linear combinations of the real responses which are the outputs of the transmitter/receiver located at an arbitrary location, as follows:

$$[\underline{f}_{RR}^{II}(x); \underline{f}_{RR}^{II}(y); \underline{f}_{RR}^{II}(z)] = \quad (49)$$

$$\begin{bmatrix} U_{11} & U_{12} & U_{13} \\ U_{21} & U_{22} & U_{23} \\ U_{31} & U_{32} & U_{33} \end{bmatrix} [\underline{f}_{RR}(x); \underline{f}_{RR}(y); \underline{f}_{RR}(z)]$$

The matrix U is determined from $$\frac{C_T C_{RT}}{\rho^6} \underline{T}_A \begin{bmatrix} 1 & 0 & 0 \\ 0 & 0 & 0 \\ 0 & 0 & 0 \end{bmatrix} \underline{T}_A \begin{bmatrix} 1 \\ 0 \\ 0 \end{bmatrix} = \qquad (50)$$

$$\frac{C_T C_{RT}}{\rho^6} \underline{T}_A{}^2 \begin{bmatrix} 1 & 0 & 0 \\ 0 & 0 & 0 \\ 0 & 0 & 0 \end{bmatrix} \begin{bmatrix} 1 \\ 0 \\ 0 \end{bmatrix} =$$

$$U_{11} \frac{C_T C_{RT}}{\rho^6} \underline{T}_A \underline{R} \begin{bmatrix} 1 & 0 & 0 \\ 0 & 0 & 0 \\ 0 & 0 & 0 \end{bmatrix} \underline{T}_A \underline{R} \begin{bmatrix} 1 \\ 0 \\ 0 \end{bmatrix} +$$

$$U_{21} \frac{C_T C_{RT}}{\rho^6} \underline{T}_A \underline{R} \begin{bmatrix} 0 & 0 & 0 \\ 0 & 1 & 0 \\ 0 & 0 & 0 \end{bmatrix} \underline{T}_A \underline{R} \begin{bmatrix} 0 \\ 1 \\ 0 \end{bmatrix} +$$

$$U_{31} \frac{C_T C_{RT}}{\rho^6} \underline{T}_A \underline{R} \begin{bmatrix} 0 & 0 & 0 \\ 0 & 0 & 0 \\ 0 & 0 & 1 \end{bmatrix} \underline{T}_A \underline{R} \begin{bmatrix} 0 \\ 0 \\ 1 \end{bmatrix}$$

$$= \frac{C_T C_{RT}}{\rho^6} \underline{T}_A{}^2 \underline{R}^2 \begin{bmatrix} U_{11} \\ U_{21} \\ U_{31} \end{bmatrix} \qquad (51)$$

where $\underline{R} = \underline{Q}^{-1} \underline{SQ}$.
This implies that $$\begin{bmatrix} 1 & 0 & 0 \\ 0 & 0 & 0 \\ 0 & 0 & 0 \end{bmatrix} \begin{bmatrix} 1 \\ 0 \\ 0 \end{bmatrix} = \frac{C_T C_{RT}}{\rho^6} \underline{R}^2 \begin{bmatrix} U_{11} \\ U_{21} \\ U_{31} \end{bmatrix}, \qquad (52)$$

hence $$\begin{bmatrix} U_{11} \\ U_{21} \\ U_{31} \end{bmatrix} = \frac{\rho^6}{C_T C_{RT}} \underline{R}^{-2} \begin{bmatrix} 1 \\ 0 \\ 0 \end{bmatrix}. \qquad (53)$$

It can be shown in a similar manner that, $$\begin{bmatrix} U_{12} \\ U_{22} \\ U_{32} \end{bmatrix} = \frac{\rho^6}{C_T C_{RT}} \underline{R}^{-2} \begin{bmatrix} 0 \\ -\frac{1}{2} \\ 0 \end{bmatrix} \qquad (54)$$

and $$\begin{bmatrix} U_{13} \\ U_{23} \\ U_{33} \end{bmatrix} = \frac{\rho^6}{C_T C_{RT}} \underline{R}^{-2} \begin{bmatrix} 0 \\ 0 \\ -\frac{1}{2} \end{bmatrix}. \qquad (55)$$

So $\underline{U}$ is simply $$\underline{U} = \frac{\rho^6}{C_T C_{RT}} \underline{R}^{-2} \underline{S}^2. \qquad (56)$$

Ambiguity resolutions are made as outlined as known by those skilled in the art. The non-linearized algorithm is shown in FIG. 8. CL LINEARIZED ALGORITHM The equation relating signal amplitude to retransmitter position and orientation can be linearized with a linearized algorithm in the vicinity of the initial position and orientation estimate calculated as explained hereinabove with the nonlinearized equations. The nine linearized equations can then be solved for the differences between the initial position and orientation estimates and the true position and orientation. Recursive application of this linearized solution overcomes the non-linearitites inherent in moderate position and orientation errors.

All information available regarding the retransmitter's position and orientation is contained in the set of amplitude measurements.

$$f_{RR}(x) = \begin{bmatrix} f_{1x} \\ f_{1y} \\ f_{1z} \end{bmatrix}, f_{RR}(y) = \begin{bmatrix} f_{2x} \\ f_{2y} \\ f_{2z} \end{bmatrix}, \text{ and } f_{RR}(z) = \begin{bmatrix} f_{3x} \\ f_{3y} \\ f_{3z} \end{bmatrix}. \qquad (57)$$

The initial or previous estimates of position and orientation can be used to compute a set of amplitudes ($f_{1x}$, $f_{1y}$, $f_{1z}$, $f_{2x}$, $f_{2y}$, $f_{2z}$, $f_{3x}$, $f_{3y}$, $f_{3z}$), that would be produced if the estimates were correct.

Figure 9:
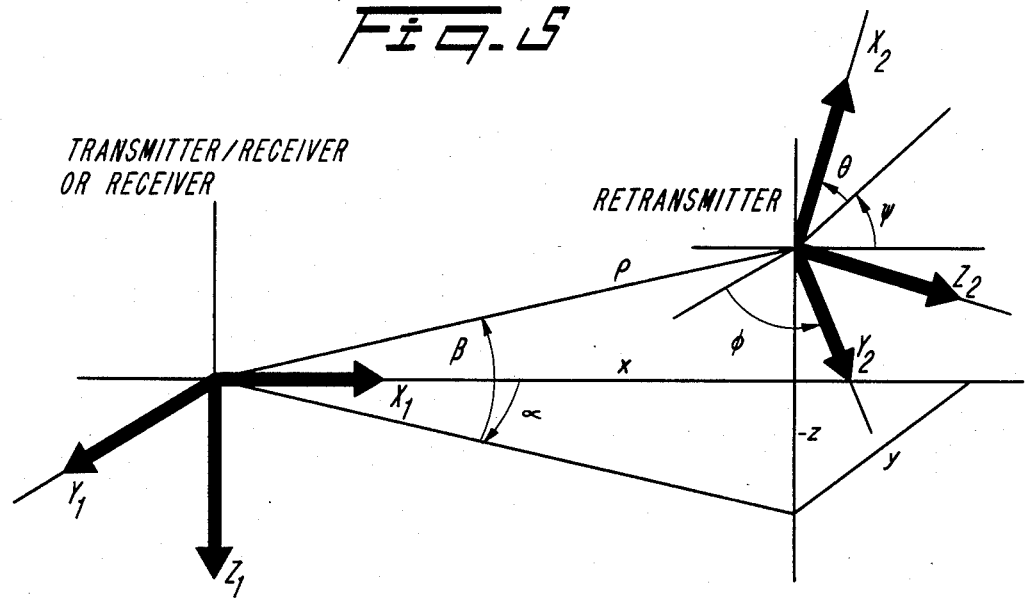
FIG. 9 shows a flow chart for the linearized algorithm which utilizes the estimates from the non-linearized algorithm and calculates the precise position and orientation of the object.

The difference between the estimated and the true position and orientation parameters are given by $$\underline{\gamma} = \begin{bmatrix} \Delta f_{1x} \\ \Delta f_{1y} \\ \Delta f_{1z} \\ \Delta f_{2x} \\ \Delta f_{2y} \\ \Delta f_{2z} \\ \Delta f_{3x} \\ \Delta f_{3y} \\ \Delta f_{3z} \end{bmatrix} = \qquad (58)$$

$$\begin{bmatrix} \frac{\partial f_{1x}}{\partial x} & \frac{\partial f_{1x}}{\partial y} & \frac{\partial f_{1x}}{\partial z} & \frac{\partial f_{1x}}{\partial \psi} & \frac{\partial f_{1x}}{\partial \theta} & \frac{\partial f_{1x}}{\partial \phi} \\ \frac{\partial f_{1y}}{\partial x} & \frac{\partial f_{1y}}{\partial y} & \frac{\partial f_{1y}}{\partial z} & \frac{\partial f_{1y}}{\partial \psi} & \frac{\partial f_{1y}}{\partial \theta} & \frac{\partial f_{1y}}{\partial \phi} \\ & & \cdots & & & \\ \frac{\partial f_{3z}}{\partial x} & \frac{\partial f_{3z}}{\partial y} & \frac{\partial f_{3z}}{\partial z} & \frac{\partial f_{3z}}{\partial \psi} & \frac{\partial f_{3z}}{\partial \theta} & \frac{\partial f_{3z}}{\partial \phi} \end{bmatrix} \underline{\partial} + \underline{\eta}$$

where $$\underline{\partial} = \begin{bmatrix} \Delta x \\ \Delta y \\ \Delta z \\ \Delta \psi \\ \Delta \theta \\ \Delta \phi \end{bmatrix} = \begin{bmatrix} x - \hat{x} \\ y - \hat{y} \\ z - \hat{z} \\ \psi - \hat{\psi} \\ \theta - \hat{\theta} \\ \phi - \hat{\phi} \end{bmatrix} \qquad (59)$$

and $$\underline{\eta} = \begin{bmatrix} n_{1x} \\ n_{1y} \\ n_{1z} \\ n_{2x} \\ n_{2y} \\ n_{2z} \\ n_{3x} \\ n_{3y} \\ n_{3z} \end{bmatrix} \text{ is a noise error vector,} \qquad (60)$$

where the elements contain estimated noise for the nine different magnetic fields. The noise includes atmospheric noise, room noise, retransmitter and receiver noise. The linearized algorithm is shown in FIG. 9.

CALIBRATION

There exist three basic problems using the quasi-static magnetic-field scattering technique: (1) field distortion from metallic scatters, (2) non-orthogonality of three-axis coils, and (3) non-ideal dipole field-pattern.

Field distortion calibration

It is possible to calibrate for field distortion by collecting all metallic scatters into one three-axis scatter, when the metallic scatters can be set equivalent to the plates seen from both the transmitter/receiver and the retransmitter. The distance to the metallic scatters from the retransmitter must be at least three times the largest dimension of the retransmitter so that the retransmitter coils can be set equivalently to a magnetic dipole.

The transmitter/receiver axes are activated one by one at $f_0$ with the retransmitter in place. The following nine measurements are made:

$$\underline{f_x}(x) = \frac{C_T}{\rho_1^3} \underline{T}\phi_1 \underline{T}\theta_1 \underline{T}\psi_1 \underline{T} - \alpha_1 \underline{T} - \beta_1 \underline{S}\underline{T}\beta_1 \underline{T}\alpha_1 \begin{bmatrix} S_x \\ 0 \\ 0 \end{bmatrix}, \quad (61)$$

$$\underline{f_y}(y) = \frac{C_T}{\rho_1^3} \underline{T}\phi_1 \underline{T}\theta_1 \underline{T}\psi_1 \underline{T} - \alpha_1 \underline{T} - \beta_1 \underline{S}\underline{T}\beta_1 \underline{T}\alpha_1 \begin{bmatrix} 0 \\ S_y \\ 0 \end{bmatrix}, \quad (62)$$

$$\underline{f_z}(z) = \frac{C_T}{\rho_1^3} \underline{T}\phi_1 \underline{T}\theta_1 \underline{T}\psi_1 \underline{T} - \alpha_1 \underline{T} - \beta_1 \underline{S}\underline{T}\beta_1 \underline{T}\alpha_1 \begin{bmatrix} 0 \\ 0 \\ S_z \end{bmatrix}, \quad (63)$$

where $S_x$, $S_y$ and $S_z$ are constants containing the magnitude of the scattered magnetic field of the metallic scatter.

$\rho_1$, $\alpha_1$, $\beta_1$, $\psi_1$, $\theta_1$, and $\phi_1$ are the coordinates of the metallic scatter seen from the transmitter/receiver.

The nine equations are solved for the nine unknowns, $\rho_1$, $\alpha_1$, $\beta_1$, $\psi_1$, $\theta_1$, $\phi_1$, $S_x$, $S_y$, $S_z$.

Figure 10:
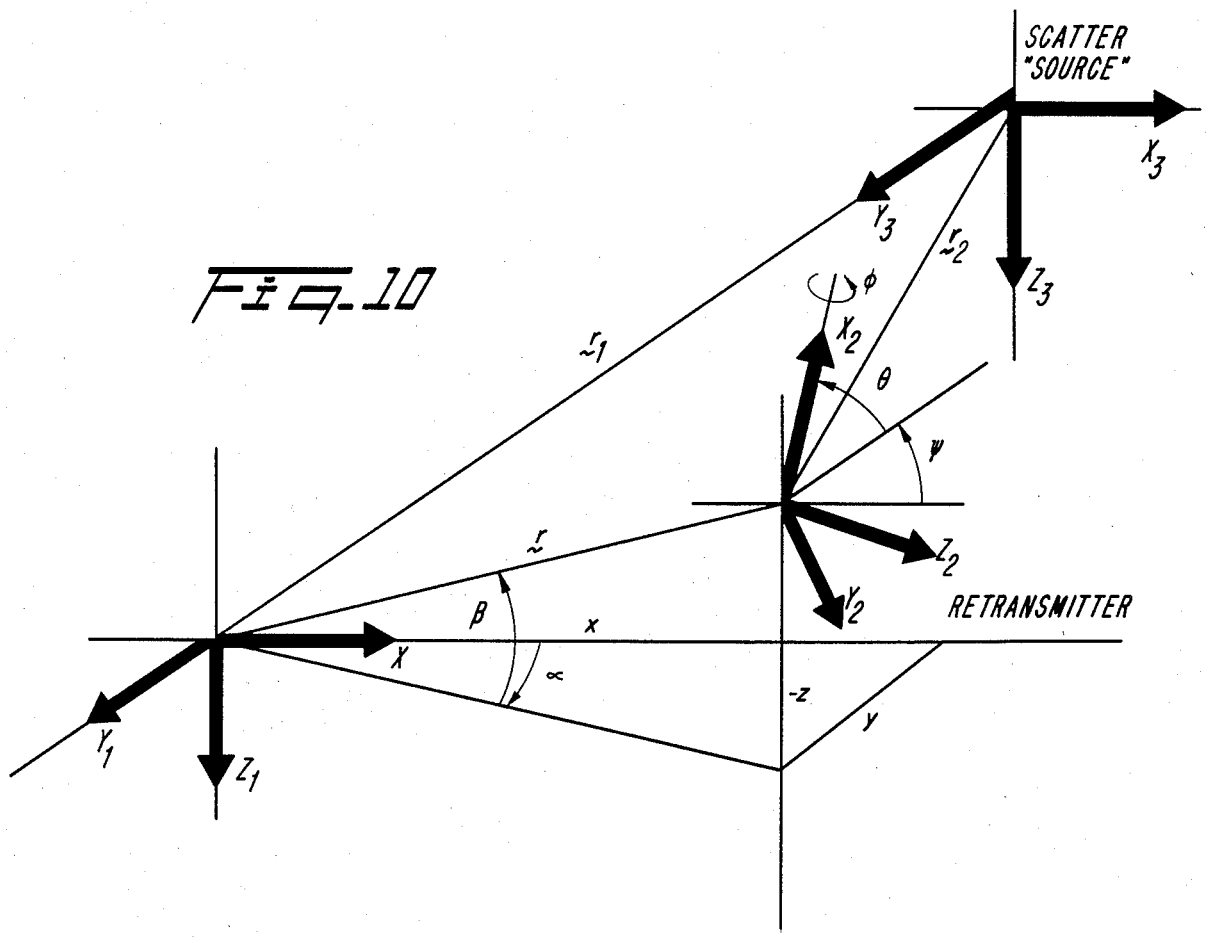
FIG. 10 shows a geometrical view similar to that of FIG. 5, but with a "scatter source" shown.

In order to compensate for the metallic scatters on the way from transmitter/receiver to the retransmitter the following corrections are made:

$$\underline{f_{RR}}^{IV}(x) = \underline{f_{RR}}^{III}(x) - \underline{f_{ST}}(x),$$

$$\underline{f_{RR}}^{IV}(y) = \underline{f_{RR}}^{III}(y) - \underline{f_{ST}}(y),$$

$$\underline{f_{RR}}^{IV}(z) = \underline{f_{RR}}^{III}(z) - \underline{f_{ST}}(z), \quad (64)$$

where $$\underline{f_{ST}}(x) = \frac{C_T C_{RT}}{\rho_2^3 \rho^3} \cdot \quad (65)$$

$$\underline{T}_A \underline{Q}^{-1} \underline{S} \underline{Q} \begin{bmatrix} 1 & 0 & 0 \\ 0 & 1 & 0 \\ 0 & 0 & 1 \end{bmatrix} \underline{T}\phi_2 \underline{T}\theta_2 \underline{T}\psi_2 \underline{T} - \alpha_2 \underline{T} - \beta_2 \underline{S}\underline{T}\beta_2 \underline{T}\alpha_2 \begin{bmatrix} S_x \\ 0 \\ 0 \end{bmatrix}$$

$$\underline{f_{ST}}(y) = \frac{C_T C_{RT}}{\rho_2^3 \rho^3} \underline{T}_A \underline{Q}^{-1} \underline{S} \underline{Q} \begin{bmatrix} 1 & 0 & 0 \\ 0 & 1 & 0 \\ 0 & 0 & 1 \end{bmatrix} \underline{T}\phi_2 \underline{T}\theta_2 \underline{T}\psi_2 \underline{T} - \quad (66)$$

$$\alpha_2 \underline{T} - \beta_2 \underline{S}\underline{T}\beta_2 \underline{T}\alpha_2 \begin{bmatrix} 0 \\ S_y \\ 0 \end{bmatrix}$$

$$\underline{f_{ST}}(z) = \frac{C_T C_{RT}}{\rho_2^3 \rho^3} \underline{T}_A \underline{Q}^{-1} \underline{S} \underline{Q} \begin{bmatrix} 1 & 0 & 0 \\ 0 & 1 & 0 \\ 0 & 0 & 1 \end{bmatrix} \underline{T}\phi_2 \underline{T}\theta_2 \underline{T}\psi_2 \underline{T} - \quad (67)$$

$$\alpha_2 \underline{T} - \beta_2 \underline{S}\underline{T}\beta_2 \underline{T}\alpha_2 \begin{bmatrix} 0 \\ 0 \\ S_z \end{bmatrix}$$

and ($\rho_2$, $\alpha_2$, $\beta_2$, $\psi_2$, $\theta_2$, $\phi_2$) can be determined from the geometry shown in FIG. 10.

In order to compensate for the metallic scatters on the way back form the retransmitter to the transmitter/receiver, following corrections are made $$\underline{f_{RR}}(x) = \underline{f_{RR}}^{IV}(x) - \underline{f_{SRT}}(x),$$

$$\underline{f_{RR}}(y) = \underline{f_{RR}}^{IV}(y) - \underline{f_{SRT}}(y),$$

$$\underline{f_{RR}}(z) = \underline{f_{RR}}^{IV}(z) - \underline{f_{SRT}}(z), \quad (68)$$

where $$\underline{f_{SRT}}(x) = \frac{C_{RT}}{\rho_2^3} \underline{T}\phi_2 \underline{T}\theta_2 \underline{T}\psi_2 \underline{T} - \alpha_2 \underline{T} - \beta_2 \underline{S}\underline{T}\beta_2 \underline{T}\alpha_2 \begin{bmatrix} S^I_x \\ 0 \\ 0 \end{bmatrix} \quad (69)$$

$$\underline{f_{SRT}}(y) = \frac{C_{RT}}{\rho_2^3} \underline{T}\phi_2 \underline{T}\theta_2 \underline{T}\psi_2 \underline{T} - \alpha_2 \underline{T} - \beta_2 \underline{S}\underline{T}\beta_2 \underline{T}\alpha_2 \begin{bmatrix} 0 \\ S^I_y \\ 0 \end{bmatrix} \quad (70)$$

$$\underline{f_{SRT}}(z) = \frac{C_{RT}}{\rho_2^3} \underline{T}\phi_2 \underline{T}\theta_2 \underline{T}\psi_2 \underline{T} - \alpha_2 \underline{T} - \beta_2 \underline{S}\underline{T}\beta_2 \underline{T}\alpha_2 \begin{bmatrix} 0 \\ 0 \\ S^I_z \end{bmatrix} \quad (71)$$

where $$S_x^I = S_x \cdot \frac{C_T}{C_T} \cdot \left( \underline{T}_A \underline{Q}^{-1} \underline{S}\underline{Q} \begin{bmatrix} 1 \\ 0 \\ 0 \end{bmatrix} \right)_x, \quad (72)$$

$$S_y^I = S_y \cdot \frac{C_T}{C_T} \cdot \left( \underline{T}_A \underline{Q}^{-1} \underline{S}\underline{Q} \begin{bmatrix} 0 \\ 1 \\ 0 \end{bmatrix} \right)_y,$$

$$S_z^I = S_z \cdot \frac{C_T}{C_T} \cdot \left( \underline{T}_A \underline{Q}^{-1} \underline{S}\underline{Q} \begin{bmatrix} 0 \\ 0 \\ 1 \end{bmatrix} \right)_z.$$

Compensation for non-orthogonality

The systems disclosed herein use a new method for calibration as compensation for any nonorthogonalty of coils, namely an automatic scanning routine. The calibration is made in an area where there are no metallic scatters. The transmitter/receiver and retransmitter are employed in a fixed gimbal, where the relative position and orientation ($\rho_{12}$, $\alpha_{12}$, $\beta_{12}$, $\psi_{12}$, $\theta_{12}$, $\phi_{12}$) are known. Instead of turning the coils, the magnetic field is generated in a pattern, which electronically "turns" the transmitter coils.

If the two three-axis coils are not orthogonal, the measured amplitudes, with the x-coil used as reference are $$(\underline{f}_{RR}^V(x))_x = \left( \underline{T}\phi_{01}\underline{T}\theta_{01}\underline{T}\phi_{12}\underline{T}\theta_{12}\underline{T}\psi_{12}\underline{T} - \alpha_{12}\underline{T} - \right.$$
$$\beta_{12}\underline{S}\underline{T}\beta_{12}\underline{T}\alpha_{12}\begin{bmatrix}1&0&0\\0&0&0\\0&0&0\end{bmatrix} \cdot \underline{T}\phi_{12}\underline{T}\theta_{12}\underline{T}\psi_{12} \cdot$$
$$\left. \underline{T} - \alpha_{12}\underline{T} - \beta_{12}\underline{S}\underline{T}\beta_{12}\underline{T}\alpha_{12}\begin{bmatrix}1\\0\\0\end{bmatrix} \right), = $$
$$\left( \underline{T}\phi_{01}\underline{T}\theta_{01} \cdot \underline{T}_{A12} \cdot \underline{R} \begin{bmatrix}1&0&0\\0&0&0\\0&0&0\end{bmatrix} \cdot \underline{T}_{A12}\underline{R}_{12}\begin{bmatrix}1\\0\\0\end{bmatrix} \right)_x \quad (73)$$

$$\underline{f}_{RR}^V(x)_z = \left( \underline{T}\phi_{02}\underline{T}\theta_{02}\underline{T}_{A12}\underline{R}_{12}\begin{bmatrix}1&0&0\\0&0&0\\0&0&0\end{bmatrix} \underline{T}_{A12}\underline{R}_{12}\begin{bmatrix}1\\0\\0\end{bmatrix} \right)_y, \quad (74)$$

$$(\underline{f}_{RR}^V(x))_z = \left( \underline{T}\phi_{03}\underline{T}\theta_{03}\underline{T}_{A12}\underline{R}_{12}\begin{bmatrix}1&0&0\\0&0&0\\0&0&0\end{bmatrix} \underline{T}_{A12}\underline{R}_{12}\begin{bmatrix}1\\0\\0\end{bmatrix} \right)_z, \quad (75)$$

$$(\underline{f}_{RR}^V(y))_y = \left( \underline{T}\phi_{04}\underline{T}\theta_{04}\underline{T}_{A12}\underline{R}_{12}\begin{bmatrix}0&0&0\\0&1&0\\0&0&0\end{bmatrix} \underline{T}_{A12}\underline{R}_{12}\begin{bmatrix}0\\1\\0\end{bmatrix} \right)_y, \quad (76)$$

$$(\underline{f}_{RR}^V(z))_z = \left( \underline{T}\phi_{05}\underline{T}\theta_{05}\underline{T}_{A12}\underline{R}_{12}\begin{bmatrix}0&0&0\\0&0&0\\0&0&1\end{bmatrix} \underline{T}_{A12}\underline{R}_{12}\begin{bmatrix}0\\0\\1\end{bmatrix} \right)_z, \quad (77)$$

The procedure is as follows: Step 1, align retransmitter x-coil with transmitter/receiver x-coil. The measurements are made for two different transmitter orientations (electronic scanning) $\pm \zeta^0$ and the unknowns $\phi_{01}$ and $\theta_{01}$ are found. The method is similar for the next steps. Step 2: Align retransmitter y-coil with transmitter/receiver x-coil. Step 3: Align retransmitter z-coil with transmitter/receiver x-coil. Step 4: Align transmitter/receiver y-coil with retransmitter y-coil. Step 5: and align transmitter/receiver z-coil with transmitter z-coil. This alignment procedure will not influence the field-pattern calibration because the two measurements used in each step are $\pm\zeta^0$.

Compensation for non-ideal dipole

The systems are also compensated for the possibility of non-ideal dipole, in that a mapping of the field is made in the same area as described above. The measurements are made by electronically "turning" the transmitter coils in steps of 1° in all the planes. The mapped measurements are saved in the computer memory and are used to increase the accuracy of the system. The mapped measurements are used to correct the initial position and orientation estimates similarly to the method used in the linearized algorithm.

COILS

The coil design parameters are N, I, $l_1$, $l_2$, $l_3$, and $\mu_1$. The size of the retransmitter coils is normally determined by the particular application. The larger the value of $\mu_1$, the more magnetic field will be transmitted and/or received. Calculations show that $\mu_1 < 4$, if the retransmitter coils are limited to a cube dimension. By selecting a design where longer ferrite rods are possible, $\mu_1 > 20$ can be achieved.

The approximate inductance of a single layer air coil (which gives the best Q) may be calculated from the simplified formula:

$$L = 2.54 \cdot \frac{a^2 n^2}{9a + 10b} \; (\mu H) \quad (78)$$

where "a" is the coil radius in cm, "b" is the coil length in cm, and "n" is the number of turns. This formula is a close approximation for coils having a length equal to or greater than 0.8 a.

It can be shown for the resonant circuit retransmitter that $R_c >> R_L$ with careful selection of the capacitance. The important factor is therefore the quality factor $Q_L$ for the inductance. The impedance of the resonant circuit is $$Z_{RT} = R_{SL}(I+Jx), \text{ where} \quad (79)$$

$R_{SL}$ = resistance in circuit
I = current in circuit
J = base of complex numbers $j^2 = -1$ $$x = 2Q \frac{\omega - \omega_0}{\omega_0}, \quad (80)$$

$\omega_0 = 2\pi f_0$
$\omega = 2\pi f$
this gives $$\frac{1}{Z_{RT}} = \frac{1}{R_{SL}} \left( \frac{1}{1+x^2} - J\frac{x}{1+x^2} \right). \quad (81)$$

The induced current at $\omega$ is $$I_{RT}(\omega_0) = (V_{RT} Q_{RT}/\omega_0 L_{RT}), \quad (82)$$

and at $\omega$ $$I_{RT}(\omega) = I_{RT}(\omega_0) \left( \frac{1}{1+x^2} - J\frac{x}{1+x^2} \right), \quad (83)$$

It is then possible to find $\omega$ for 40 dB attenuation $$\omega = (50 \; \omega_0/Q) + \omega_0 \quad (84)$$

An example of frequencies and the quality factor: Q=100, $f_0$=10 kHz, $f_1$=12 kHz, $f_2$=14 kHz, and $f_3$=16 kHz with an attenuation of 32 dB.

The size of the retransmitter can be less than a cube of 20 mm$^3$ with proper design and no limitation on the transmitter/receiver dimensions.

Position accuracy within 1% of the distance between transmitter/receiver and retransmitter, and orientation accuracy within 0.5° are achieved.

THE PREFERRED EMBODIMENTS

The First Embodiment

As shown in FIG. 3, the system 10 includes a transmitter/receiver section 11 and a retransmitter generally designated by the reference numeral 20. The transmitter/receiver section 11 includes an x-axis transmitter/receiver 13, a y-axis transmitter/receiver 15 and a z-axis transmitter/receiver 17. The retransmitter 20 is shown in FIG. 3 in a schematic fashion with the three components thereof shown separately; however, it is to be understood that the x, y and z-axis retransmitters of the retransmitter 20 are mounted together in substantially mutually orthogonal relation. The retransmitter 20 includes an x-axis retransmitter 21, a y-axis retransmitter 25 and a z-axis retransmitter 29. The x-axis retransmitter includes a coil 22 and a capacitor 23. Reference numeral 24 refers to a resistor which is shown in the circuitry of the retransmitter 21. In reality, there is no resistor in the retransmitter circuitry, however, the resistor 24 is shown as an indication of the inherent resistances in the circuitry of the retransmitter 21 caused by the wiring and other factors as is known to those skilled in the art. The retransmitter 25 includes a coil 26 and a capacitor 27 with a resistor 28 being shown for the same reasons as discussed above regarding the resistor 24. The retransmitter 29 includes a coil 30 and a capacitor 31 with the resistor 32, again, being shown for the same reasons as discussed hereinabove with respect to the resistor 24.

Looking first at the x-axis transmitter/receiver 13, it is seen that an oscillator 35 is connected thereto for the purpose of providing a voltage thereacross at a frequency $f_1$. Further, a comparator 41 is provided so that a comparison can be made of the voltage across the oscillator 35 and the voltage induced across the coil 14 by one of the retransmitters 21, 25 or 29. For the same reasons, the transmitter/receiver 15 has connected thereto an oscillator 37 and a comparator 43 while the transmitter/receiver 17 has connected thereto an oscillator 39 and a comparator 45. Connected to each comparator is a bandpass filter 47 provided so that only the magnetic field of the transmitted frequency is received and a preamplifier 49 which amplifies the signal coming from the bandpass filter 47. The signals being outputted by the preamplifiers 49 are inputted into a multiplexer 53 which is controlled by the microprocessor 57. The signals inputted to the multiplexer 53 from the preamplifiers 49 are outputted therefrom to an analog-to-digital converter 55 which converts the signals to digital signals usable by the microprocessor 57. The microprocessor 57 also controls the control circuit 51 which controls the operation of the oscillators 35, 37 and 39 so that only one oscillator is operating at any given moment. A display 59 is connected to the microprocessor to display any data calculated thereby as to the position and orientation of an object (not shown in FIG. 3) to which the retransmitter 20 is attached.

FIG. 3 also shows retransmitter 200, including retransmitters 210, 250, and 290. The x-axis retransmitter includes the coil 220, the capacitor 230, and the inherent resistor 240. The y-axis retransmitter includes the coil 260, the capacitor 270, and the inherent resistor 280. The z-axis retransmitter includes the coil 300, the capacitor 310, and the inherent resistor 320. The system 10 may be utilized to determine the position and orientation of both the retransmitters 20 and 200, since the retransmitters 21, 25 and 29 of retransmitter 20 are designed to resonate at distinct frequencies f1, f2 and f3 and the retransmitters 210, 250 and 290 of retransmitter 200 are designed to resonate at distinct frequencies f10, f20, and f30. Thus, the oscillator 35 can oscillate at both f1 and f10, the oscillator 37 can oscillate at both f2 and f20, and the oscillator 39 can oscillate at both f3 and f30. In a similar fashion, as many retransmitters as desired may be simultaneously used.

The operation of the embodiment of FIG. 3 is as follows:

The control circuit 51 is controlled by the microprocessor 57 to first cause the oscillator 35 to place a voltage across the transmitter/receiver 13 at a predetermined frequency $f_1$. This frequency is received by the retransmitter 21, the circuitry of which is designed to retransmit at the frequency $f_1$. This retransmission of the frequency $f_1$ is sensed at each of the transmitter/receivers 13, 15 and 17. The comparator 41 subtracts the voltage received at the coil 14 from the voltage outputted on the oscillator 35 and presents this signal to the multiplexer 53 via the bandpass filter 47 and preamplifier 49. The comparator 43 receives as an input the voltage induced in coil 16 from the retransmitter 21. In this case, however, the oscillator 39 was not operating, so the signal outputted by the comparator 43 arrived at by subtracting the voltage across the coil 16 from the voltage across the oscillator 37 is, in fact, the full negative value of the voltage across the coil 16. No voltage is induced over coil 16 caused by the magnetic field generated by the voltage placed over the coil 14, since the coils 14 and 16 are perpendicular to each other. This value is inputted into the multiplexer 53 via the bandpass filter 47 and the preamplifier 49. Regarding the z-axis circuitry, the coil 18 also receives the retransmitted signal from the retransmitter 21 and has a voltage induced thereacross. Since the oscillator 39 was not operating during the transmission and receipt of the x signal, the comparator 45 subtracts the induced voltage across the coil 18 from 0 and outputs a signal to the multiplexer 53 via the bandpass filter 47 and the preamplifier 49 equal to the full negative value of the voltage induced across the coil 18 by the retransmitter 21. No voltage is induced over coil 18 caused by the magnetic field generated by the voltage placed over the coil 14 since the coils 14 and 18 are perpendicular to each other. In similar fashion, when the oscillator 37 is activated by the control circuit 51, the y-axis retransmitter 25 retransmits the signal which induces voltages across the three coils 14, 16 and 18. Since the oscillator 37 is in operation, the comparator 43 outputs a signal equal to the difference between the voltage across the oscillator 37 less the voltage induced across the coil 16 by the y-axis transmitter 25. Since the oscillators 35 and 39 do not operate during the operation of the oscillator 37, the respective comparators 41 and 45 send signals to the multiplexer 53 equal to the full negative value of the respective voltages induced across the coils 14 and 18. From the above explanation, the explanation with regard to the z-axis circuitry should be clearly evident. Suffice to say, that the actuation of the oscillator 39 by the control circuit 51 at frequency $f_3$ causes the retransmitter 29 to retransmit a signal received by the coils 14, 16 and 18 which causes the voltages to be outputted by the comparators 41, 43 and 45 in a similar manner to that which was discussed hereinabove.

After the three oscillators 35, 37 and 39 have been sequentially actuated, a total of nine voltages have been received by the multiplexer 53, have been converted to digital signals by the analog-to-digital converter 55, and have been inputted to the microprocessor 57. From these nine received voltages, the estimates of the position and orientation of the retransmitter 20 are calculated using the non-linearized algorithm discussed hereinabove and from the data calculated through the use of the non-linearized algorithm, the linearized algorithm also discussed hereinabove is utilized to calculate the actual position of the retransmitter in terms of the coordinates x, y and z and the orientation of the retransmitter 20 in terms of the orientation coordinates $\Psi$, $\theta$ and $\phi$.

The Second Embodiment

Figure 4:
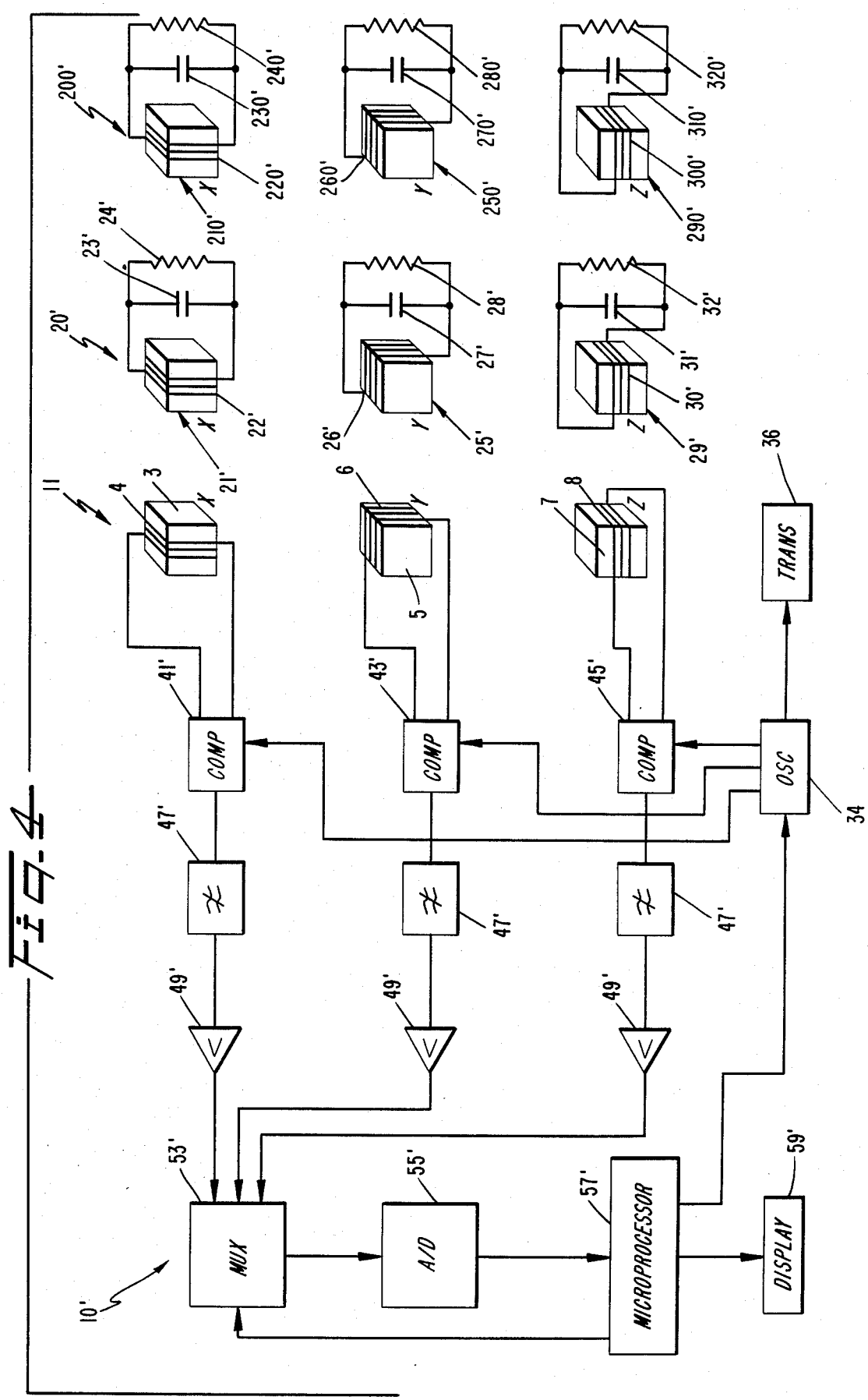
FIG. 4 shows a schematic view of a second embodiment of the present invention.

Reference is now made to FIG. 4 which shows a second embodiment of the system in accordance with the present invention which is slightly modified from the system described in conjunction with FIG. 3. As such, in the description of FIG. 4, like elements will be referred to with like primed reference numerals. In view of the similarities between the embodiments of FIGS. 3 and 4, the embodiment of FIG. 4 will be discussed in terms of its distinctions from the embodiment of FIG. 3. As shown in FIG. 4, the transmitter/receiver structure of FIG. 3 has been replaced with a separate transmitter 36 and three receivers 3, 5 and 7. The transmitter 36 is connected with a single oscillator 34 which is adjustable by the microprocessor 57' to place a voltage across the transmitter 36 which is at one of three predetermined frequencies corresponding to the resonant frequencies of the respective retransmitters 21', 25' and 29'. As further shown, the oscillator 34 has three output lines which go to the respective comparator 41', comparator 43' and comparator 45'.

The purpose of these output lines is so that the respective comparators will receive respective signals indicative of the induced voltage at the coils 4, 6 and 8 caused by the magnetic field generated by the voltage placed over coil 36. These voltages are measured by an initial calibration at the frequencies f1 and f2 and f3 with no retransmitters present. The output lines from the oscillator 34 to the comparators 41', 43' and 45' are made as parts of the voltage from the oscillator outputted over the coil 36. Otherwise, the operation of the embodiment of FIG. 4 is the same as the embodiment of FIG. 3 with the microprocessor 57' controlling the multiplexer 53', the display 59' and the operation of the oscillator 34 not only with regard to the outputting of signals to the comparators but also as to providing control of which frequency is transmitted by the transmitter 36. Again, the calculations for the non-linearized algorithm and the linearized algorithm are the same as those discussed hereinabove with respect to FIG. 3.

FIG. 4 also shows retransmitter 200', including retransmitters 210', 250' and 290'. The system 10' may be utilized to determine the position and orientation of both the retransmitters 20' and 200'. Since the retransmitters 21', 25' and 29' of retransmitter 200' are designed to resonate at frequencies f1, f2 and f3, and the retransmitters 210', 250', and 290' of retransmitter 200' are designed to resonate at frequencies f10, f20 and f30. All frequencies are different from each other. Thus the oscillator 34 can oscillate at all the above mentioned frequencies. In a similar fashion, as many retransmitters as desired may be simultaneously used.

FIG. 5 illustrates the geometry for position and orientation measurement of the embodiment of FIGS. 3 and 4. The figure shows, schematically, the retransmitters as well as the transmitter/receiver (FIG. 3) or receiver (FIG. 4). The position and orientation parameters are illustrated in FIG. 5.

The Third Embodiment

FIG. 6 illustrates a third exemplary embodiment of the present invention. As shown in FIG. 6, the System 100 includes a single retransmitter 121 having a coil 123, a capacitor 125, and with reference numeral 127 referring to a resistance which is shown only as representative of the inherent resistances within the circuitry of the retransmitter 121. The System 100 further includes three three-axis receivers A, B and C with the receiver A consisting of coils 102, 104 and 106 mounted on respective members 101, 103 and 105 which may, if desired, comprise the same member upon which all three coils 102, 104 and 106 are simultaneously wound. The receiver B consists of coils 108, 110 and 112 mounted on respective members 107, 109 and 111 which, again, may comprise a single member with the three coils 108, 110 and 112 wound therearound. Similarly, the receiver C consists of coils 114, 116 and 118 wound around respective members 113, 115 and 117 which may, again, if desired, consist of the same member with the coils 114, 116 and 118 simultaneously wound therearound. Each individual coil has an output connected to the multiplexer 153 via a respective filter 147 and the preamp 149 which operate in the same manner as the corresponding elements discussed hereinabove with respect to the embodiments of FIGS. 3 and 4. The microprocessor 157 controls the operation of the multiplexer 153 to thereby control the outputting of individual signals from the multiplexer 153 to the analog-to-digital converter 155 which converts the signals to digital signals usable by the microprocessor 157. An oscillator 134 is provided which is controlled by the microprocessor 157 and which places a voltage across the transmitter coil 136, which voltage is at a predetermined chosen frequency. The transmitter 136 includes a housing 119 with a coil 120 wound therearound.

FIG. 6 also shows retransmitter 1210, including coil 1230, the capacitor 1250, and the inherent resistor 1270. The system 100 may be utilized to determine the position and orientation of both the retransmitters 121 and 1210, since the retransmitter 121 is designed to resonate at the frequency f1 and the retransmitter 1210 is designed to resonate at the frequency f2. Thus the oscillator 134 can oscillate at both f1 and f2. In a similar fashion, as many retransmitters as desired may be simultaneously used.

Figure 7:
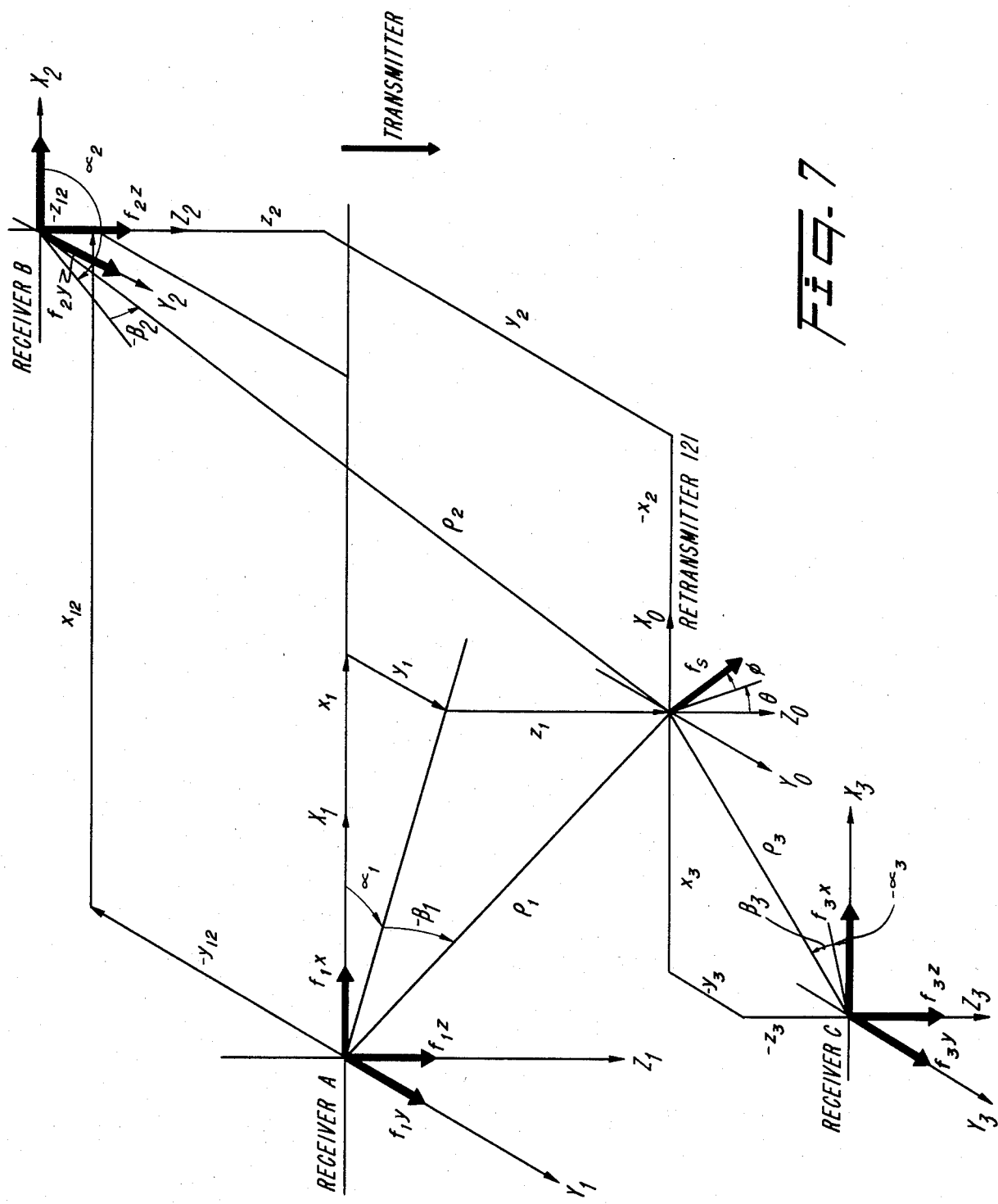
FIG. 7 shows a geometrical view of the system schematically illustrated in FIG. 6.

In the operation of the embodiment illustrated in FIG. 6, the receivers A, B and C are deployed in spaced relation within a work area as best shown in FIG. 7. The transmitter 136 is also located adjacent the work area and is operated by the microprocessor to transmit a magnetic field at the resonant frequency fo the retransmitter 121. The retransmitter resonates and retransmits this frequency toward the nine coils arranged as receivers A, B and C. This retransmission of the magnetic field creates nine distinct voltages at the respective nine coils which voltages are related to the position and orientation of the retransmitter 121 within the work area. Each voltage is processed to a respective filter 147 and preamp 149 before being inputted in the multiplexer 153. From there, under the control of the microprocessor 157, the signals are fed through the analog-to-digital converter 155 and thence are inputted in the form of digital signals into the microprocessor 157. The induced voltage, at the coils 102, 104, 106, 108, 110, 112, 114, 116 and 118, is caused by the magnetic field generated by the voltage placed over coil 136. These voltages are measured by an initial calibration at the frequencies f1, f2 and f3 with no retransmitters present. The inputted signals are first compensated therefore in the microprocessor. The microprocessor utilizes the non-linearized algorithm and the linearized algorithm discussed hereinabove to calculate an estimate of the position and orientation of the retransmitter 121, and from this data the true position and orientation of the retransmitter 121.

Compensations

In the same manner as described hereinabove for all the embodiments, field distortion calibrations and compensations for metallic scatters may be undertaken as well as compensations for non-orthogonalities of the three axis receivers A, B and C. A further compensation for non-ideal dipole as discussed hereinabove may be undertaken.

Applications

Many applications exist for a system which enables the measurement of the position and orientation of a passive target in six degrees of freedom. The following list of applications has been compiled by applicant and should in no way be considered to be limiting on the applications feasible in conjunction with the embodiments of the present invention:

(1) The systems disclosed herein can measure the position and orientation of several targets placed on a person's hand.

(2) The systems in accordance with the present invention can be utilized to measure the position and orientation of several targets placed on the human body (gaitanalysis).

(3) The systems disclosed hereinabove in accordance with the present invention can be utilized to measure the position and orientation of a target in a fixed three-dimensional space. These measurements may be made continuously or on a point-by-point basis. Further, the invention may be utilized to make six-dimensional drawings of any model placed in the three-dimensional space.

(4) The invention disclosed herein may be utilized as a six-dimensional input for computer-type games. (5) The systems disclosed herein may be utilized in stress and vibration monitoring of machines and large structures. They may also be used in deformation tests of polymeric materials and for alignment, angle measurement and board sighting operations.

(6) The systems disclosed herein may be utilized as a direct input device for communication and control devices in view of the passive nature of the target. In this regard, it is noted that only the output device and the display are active.

(7) The systems disclosed herein may be utilized in conjunction with a non-preprogrammed robot. All that must be done is attach a retransmitting target at the point where action is to be taken by the robot. As such, dynamic interaction is possible between the robot and the object.

Regarding the systems described hereinabove, certain parameters have been found to be usable in conjunction with various applications of the system components. While these parameters should not be considered to be limiting in any way, they are presented herewith as examples of parameters which may be used in conjunction with the present invention. For example, regarding the embodiments of FIGS. 3 and 4, the retransmitter may be as small as 15 mm$^3$ for a work area of the size 1 m$^3$. Similar parameters may be utilized in the retransmitter 121 disclosed in conjunction with the embodiment of FIG. 6. The transmitter/receiver coils of the embodiment of FIG. 3, as well as the receiver coils of the embodiments of FIGS. 4 and 6, may be wound on cubes of a size 25 mm$^3$. Again, these parameters are merely exemplary and should not be considered to be limiting in any way upon the teachings of the present invention.

Various modifications, alterations and changes in the embodiments disclosed herein as well as in the corresponding methods may occur to those skilled in the art. Accordingly, it is intended that the present invention only be limited by the scope of the following claims.

I claim:

1. A magnetic position and orientation measurement system comprising:
   (a) an object, the position and orientation of which are to be measured;
   (b) retransmitter means attached to said object in predetermined position and orientation with respect thereto; and
   (c) electrical circuitry means including:
      (i) transmitter means for transmitting a magnetic field at a resonant frequency of said retransmitter means;
      (ii) receiver means for receiving a magnetic field retransmitted by said retransmitter means; said receiver means converting said magnetic field into a proportional voltage; and
      (iii) calculating means for receiving voltages from said receiver means related to said magnetic field and, therefrom, calculating the position (x, y, z) and orientation ($\psi$, $\theta$, $\phi$) in six degrees of freedom of said retransmitter means and said object.

2. The invention of claim 1, wherein said transmitter means and receiver means are combined in coil means.

3. The invention of claim 2, wherein said coil means comprises three substantially mutually orthogonal coils, each said coil comprising a combined transmitter and reciever.

4. The invention of claim 3, wherein said coils are wound on a substantially cubical transmitter-receiver housing.

5. The invention of claim 3, wherein each said coil has electrically connected thereto oscillating means for placing a voltage across said coil at a predetermined frequency different from the predetermined frequencies of voltages placed across others of said coils.

6. The invention of claim 1 wherein the position and orientation of a further object may be determined by attachment of a further retransmitter having resonant frequencies different from the first recited retransmitter resonant frequencies to said further object, wherein:
   (i) said transmitter means may be adjusted for transmitting a magnetic field at the resonant frequencies of said further retransmitter means;
   (ii) said receiver means may receive a magnetic field retransmitted by said further retransmitter means; and (iii) said calculating means being adapted for receiving signals from said receiver means related to the magnetic field retransmitted by said further retransmitter means and, therefrom calculating the position and orientation of said further retransmitter means and said further object.

7. The invention of claim 1, or claim 6, wherein said transmitter means comprises a single transmitter coil and said receiver means comprises three substantially mutually orthogonal receiving coils.

8. The invention of claim 1, or claim 6, wherein said transmitter means comprises a single transmitter coil and said receiver means comprises a plurality of three-axis receivers.

9. The invention of claim 8, wherein said plurality of three-axis receivers comprise three three-axis receivers, each said receiver comprising three coils mounted in substantially mutually orthogonal relation.

10. The invention of claim 9, wherein said retransmitter means comprises a single retransmitter circuit designed to resonate at a single frequency, said transmitter means including oscillator means controlled by said calculating means to place a voltage across said transmitter coil at the resonant frequency of said retransmitter circuit.

11. A method of magnetically measuring the position and orientation of an object including the steps of:
  (a) placing an object in a defined space;
  (b) attaching a retransmitter means to the object in a predetermined position and orientation with respect thereto;
  (c) placing a plurality of receiver coils in said space at predetermined locations therein;
  (d) transmitting a magnetic field at a resonant frequency of said retransmitter means;
  (e) retransmitting said magnetic field with said retransmitter means;
  (f) receiving said retransmitted magnetic field with said receiver coils; and
  (g) calculating the position and orientation of said object from voltages created over said receiver coils by said retransmitted magnetic field.

12. The method of claim 11, wherein said retransmitter means comprises three substantially mutually orthogonally mounted retransmitter circuits, each said circuit having a unique resonant frequency, and wherein said transmitting step comprises sequentially transmitting magnetic fields at the respective resonant frequencies of said circuits.

13. The method of claim 12, further including the steps of:
  (a) sequentially retransmitting said magnetic fields with said circuits; and
  (b) sequentially receiving said retransmitted magnetic fields with said receiver coils.

14. The method of claim 11, wherein said receiver coils also perform said transmitting step.

15. A magnetic position and orientation measurement system comprising:
  (a) an object, the position and orientation of which are to be measured;
  (b) retransmitter means attached to said object in predetermined position and orientation with respect thereto; and
  (c) electrical circuitry means including:
    (i) transmitter means for transmitting a magnetic field at a resonant frequency of said retransmitter means;
    (ii) receiver means for receiving a magnetic field retransmitted by said retransmitter means;
    (iii) said receiver means converting said magnetic field into a proportional voltages;
    (iv) calculating means for receiving voltages from said receiver means related to said magnetic field and, therefrom calculating the position (x, y, z) and orientation ($\psi$, $\theta$, $\phi$) in six degrees of freedom of said retransmitter means and said object;
  (d) further wherein said transmitter means and receiver means are combined in coil means comprising three substantially mutually orthogonal coils, each said coil comprising a combined transmitter and receiver;
  (e) each coil having electrically connected thereto oscillating means for placing a voltage across each coil at a predetermined frequency different from the predetermined frequencies of voltages placed across others of said coils;
  (g) said transmitter means comprising three retransmitter circuits mounted together in substantially mutually orthogonal relation, each retransmitter circuit being designed to resonate at only one of said predetermined frequencies different from the predetermined frequencies causing respective others of said retransmitter circuits to resonate, whereby each of said coils is operable to cause only a respective one of said retransmitter circuits to resonate.

16. A magnetic position and orientation measurement system comprising:
  (a) an object, the position and orientation of which are to be measured;
  (b) retransmitter means attached to said object in predetermined position and orientation with respect thereto; and
  (c) electrical circuit means including:
    (i) transmitter means for transmitting a magnetic field at a resonant frequency of said retransmitter means;
    (ii) receiver means for receiving a magnetic field retransmitted by said retransmitter means;
    (iii) said receiver means converting said magnetic field into a proportional voltage;
    (iv) calculating means for receiving voltages from said receiver means related to said magnetic field and, therefrom calculating the position (x,y,z) and orientation ($\psi$, $\theta$, $\phi$) in six degrees of freedom of said retransmitter means and said object;
  (d) said transmitter means comprising a single transmitter coil and said receiver means comprising three substantially mutually orthogonal receiving coils;
  (e) said transmitter means including control means enabling switching between a plurality of predetermined frequencies corresponding to the number of receiving coils.

17. The invention of claim 16, wherein said retransmitter means comprises three retransmitter circuits mounted together in substantially mutually orthogonal relation, each retransmitter circuit being designed to resonate at only one of said predetermined frequencies different from the predetermined frequencies causing respective others of said retransmitter circuits to resonate, whereby said transmitter means may cause only one of said retransmitter circuits to resonate at any one time.

18. The invention of claim 17, wherein a compensation is made for the induced voltage in the receiver coils caused by the magnetic field generated by the transmitter means alone.

19. A magnetic position and orientation measurement system comprising:
   (a) a first object, the position and orientation of which are to be measured;
   (b) first retransmitter means attached to said object in predetermined position and orientation with respect thereto; and
   (c) electrical circuitry means including:
      (i) transmitter means for transmitting a magnetic field at a resonant frequency of said retransmitter means;
      (ii) receiver means for receiving a magnetic field retransmitted by said retransmitter means;
      (iii) said receiver means converting said magnetic field into a proportional voltage;
      (iv) calculating means for receiving voltages from said receiver means related to said magnetic field and, therefrom calculating the position (x,y,z) and orientation ($\psi$, $\theta$, $\phi$) in six degrees of freedom of said transmitter means and said object;
   (d) further wherein the position and orientation of a second object may be determined by attachment of a second retransmitter means having a second resonant frequency different from the resonant frequency of said first retransmitter means, said second retransmitter means being attached to said second object in a predetermined position and orientation with respect to said second object;
      (i) said transmitter means being adjustable to transmit a magnetic field at the resonant frequency of said second retransmitter means;
      (ii) said receiver means receiving a magnetic field retransmitted by said second retransmitter means; and
      (iii) said calculating means being adapted to receive signals from said receiver means related to the magnetic field retransmitted by said second retransmitter means and, therefrom calculating the position and orientation of said second retransmitter means and said second object;
   (e) said transmitter means comprising a single transmitter coil and said receiver means comprises three substantially mutually orthogonal coils; and
   (f) further wherein said transmitter means includes control means enabling switching between a plurality of predetermined frequencies corresponding to the number of receiving coils.

20. The invention of claim 19, wherein each said retransmitter means comprises three retransmitter circuits mounted together in substantially mutually orthogonal relation, each retransmitter circuit being designed to resonate at only one of said predetermined frequencies different from the predetermined frequencies causing respective others of said retransmitter circuits to resonate, whereby said transmitter means may cause only one of said retransmitter circuits to resonate at any one time.

21. A magnetic position and orientation measurement system comprising:
   (a) an object, the position and orientation of which are to be measured;
   (b) retransmitter means attached to said object in predetermined position and orientation with respect thereto; and
   (c) electrical circuitry means including:
      (i) transmitter means for transmitting a magnetic field at a resonant frequency of said retransmitter means;
      (ii) receiver means for receiving a magnetic field retransmitted by said retransmitter means;
      (iii) said receiver means converting said magnetic field into a proportional voltage;
      (iv) calculating means for receiving voltages from said receiver means related to said magnetic field and, therefrom calculating the position (x,y,z) and orientation ($\psi$, $\theta$, $\phi$) in six degrees of freedom of said retransmitter means and said object;
   (d) said transmitter means comprising a single transmitter coil and said receiver means comprising three three-axis receivers, each said receiver means comprising three receiver coils mounted in substantially mutually orthogonal relation;
   (e) said retransmitter means comprising a single retransmitter circuit designed to resonate at a single frequency, said transmitter means including oscillator means controlled by said calculating means to place a voltage across said transmitter coil at the resonant frequency of said retransmitter circuit;
   (f) further wherein a compensation is made for induced voltage in the receiver coils caused by the magnetic field generated by the transmitter alone.

22. A magnetic position and orientation measurement system comprising:
   (a) an object, the position and orientation of which are to be measured;
   (b) retransmitter means attached to said object in predetermined position and orientation with respect thereto; and
   (c) electrical circuitry means including:
      (i) transmitter means for transmitting a magnetic field at a resonant frequency of said retransmitter means;
      (ii) receiver means for receiving a magnetic field retransmitted by said retransmitter means;
      (iii) said receiver means converting said magnetic field into a proportional voltage;
      (iv) calculating means for receiving voltages from said receiver means related to said magnetic field and, therefrom, calculating the position (x,y,z) and orientation ($\psi$, $\theta$, $\phi$) in six degrees of freedom of said retransmitter means and said object;
   (d) wherein the position and orientation of a further object may be determined by attachment of a further retransmitter having a resonant frequency different from the resonant frequency of said retransmitter;
      (i) said transmitter means being adjustable for transmitting a magnetic field at the resonant frequency of said further retransmitter means;
      (ii) said receiver means being adapted to receive a magnetic field retransmitted by said further retransmitter means; and
      (iii) said calculating means being adapted to receive signals from said receiver means related to the magnetic field retransmitted by said further retransmitter means and, therefrom calculating the position and orientation of said further retransmitter means and said further object;
   (e) said transmitter means comprising a single transmitter coil and said receiver means comprising three three-axis receivers, each said receiver means comprising three coils mounted in substantially mutually orthogonal relation;

(f) said retransmitter means comprising a single retransmitter circuit designed to resonate at a single frequency, said transmitter means including oscillator means controlled by said calculating means to place a voltage across said transmitter coil at the resonant frequency of said retransmitter circuit; and (g) further wherein a compensation is made for induced voltage in the receiver coils caused by the magnetic field generated by the transmitter means alone.

23. A method of magnetically measuring the position and orientation of an object including the steps of:

(a) placing an object in a defined space;

(b) attaching a retransmitter means to the object in a predetermined position and orientation with respect thereto;

(c) placing a plurality of receiver coils in said space at predetermined locations therein;

(d) transmitting a magnetic field at a resonant frequency of said retransmitter means;

(e) retransmitting said magnetic field with said retransmitter means;

(f) receiving said retransmitted magnetic field with said receiver coils; and (g) calculating the position and orientation of said object from voltages created over said receiver coils by said retransmitted magnetic field;

(h) said receiver coils being mounted in substantially mutually orthogonal relation and further including the step of compensating for any inadvertant non-orthogonalities in said receiver coils prior to said calculating step.

24. The method of claim 23, further including the step of compensating for field distortion caused by metallic scatters.

25. The method of claim 24, further including the step of calibrating to compensate for the Earth's magnetic field.

* * * * *